United States Patent
Kim et al.

(10) Patent No.: US 11,598,933 B2
(45) Date of Patent: Mar. 7, 2023

(54) VISIBLE LIGHT BLOCKING LENS ASSEMBLY AND ELECTRONIC DEVICE INCLUDING THE SAME

(71) Applicant: Samsung Electronics Co., Ltd., Gyeonggi-do (KR)

(72) Inventors: Dongwoo Kim, Gyeonggi-do (KR); Changhan Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/655,520

(22) Filed: Oct. 17, 2019

(65) Prior Publication Data

US 2020/0150387 A1 May 14, 2020

(30) Foreign Application Priority Data

Nov. 14, 2018 (KR) .................. 10-2018-0139644

(51) Int. Cl.
*G02B 13/00* (2006.01)
*G02B 5/20* (2006.01)
(Continued)

(52) U.S. Cl.
CPC ............ *G02B 13/004* (2013.01); *G01C 3/08* (2013.01); *G02B 5/208* (2013.01); *G02B 9/34* (2013.01); *G06T 7/586* (2017.01); *G06V 20/10* (2022.01); *G06V 40/10* (2022.01); *H04N 5/2254* (2013.01); *H04N 5/2354* (2013.01); *H04N 5/23229* (2013.01); *G02B 9/60* (2013.01); *G02B 13/0045* (2013.01); *G06T 2207/10048* (2013.01); *G06T 2207/30196* (2013.01)

(58) Field of Classification Search
CPC .. G02B 13/004; G02B 13/0045; G02B 5/208; G06T 2207/10048
See application file for complete search history.

(56) References Cited

U.S. PATENT DOCUMENTS 9,804,368 B2 10/2017 Cheng et al.
9,864,168 B2 1/2018 Bone
(Continued)

FOREIGN PATENT DOCUMENTS

CN 105911673 A 8/2016
KR 10-2010-0092064 A 8/2010
(Continued)

OTHER PUBLICATIONS

International Search Report dated Jan. 30, 2020.
(Continued)

*Primary Examiner* — Jayanti K Patel
*Assistant Examiner* — Christopher Kingsbury Glover
(74) *Attorney, Agent, or Firm* — Cha & Reiter, LLC

(57) ABSTRACT

A disclosed lens assembly may include at least four lenses sequentially arranged along an optical axis from a subject to an image sensor. Among the at least four lenses, a first lens disposed closest to the subject may have a visible light transmittance ranging from 0% to 5%, and, among subject-side surfaces and image-sensor-side surfaces of remaining lenses other than the first lens, at least four surfaces may include an inflection point. The lens assembly or an electronic device including the lens assembly may be variously implemented according to embodiments.

20 Claims, 14 Drawing Sheets

(51) Int. Cl.
  *G01C 3/08* (2006.01)
  *G02B 9/34* (2006.01)
  *H04N 5/225* (2006.01)
  *G02B 9/60* (2006.01)
  *H04N 5/235* (2006.01)
  *G06T 7/586* (2017.01)
  *H04N 5/232* (2006.01)
  *G06V 20/10* (2022.01)
  *G06V 40/10* (2022.01)

(56) References Cited

U.S. PATENT DOCUMENTS

| | | | |
|---|---|---|---|
| 9,869,847 B2 | 1/2018 | Scepanovic et al. | |
| 2010/0309367 A1* | 12/2010 | Iba | G02B 13/004 348/E5.045 |
| 2011/0069378 A1 | 3/2011 | Lin et al. | |
| 2014/0049834 A1 | 2/2014 | Lee | |
| 2015/0227790 A1* | 8/2015 | Smits | G06V 40/19 348/78 |
| 2015/0370039 A1 | 12/2015 | Bone | |
| 2015/0378130 A1 | 12/2015 | Lee | |
| 2016/0246033 A1 | 8/2016 | Jeon et al. | |
| 2016/0259146 A1 | 9/2016 | Liu et al. | |
| 2017/0123192 A1* | 5/2017 | Scepanovic | G02B 13/004 |
| 2017/0176717 A1 | 6/2017 | Lai et al. | |
| 2017/0227742 A1 | 8/2017 | Hseih et al. | |
| 2018/0003966 A1* | 1/2018 | Kilcher | G02F 1/15 |
| 2018/0039046 A1 | 2/2018 | Lee et al. | |
| 2018/0120535 A1* | 5/2018 | Lee | G02B 13/008 |
| 2018/0184056 A1* | 6/2018 | Kawai | G01S 7/4814 |
| 2019/0101724 A1 | 4/2019 | Chen et al. | |
| 2019/0101725 A1* | 4/2019 | Jung | G02B 9/60 |
| 2019/0346741 A1* | 11/2019 | Cammenga | G02F 1/137 |
| 2020/0110327 A1* | 4/2020 | Turnbull | G02B 5/23 |

FOREIGN PATENT DOCUMENTS

| | | |
|---|---|---|
| KR | 10-2015-0074483 A | 7/2015 |
| KR | 10-2015-0138755 A | 12/2015 |
| KR | 10-2016-0122114 A | 10/2016 |
| KR | 10-1671451 B1 | 11/2016 |
| TW | I634360 B | 9/2018 |

OTHER PUBLICATIONS

European Search Report dated Sep. 13, 2021.
Examination Report dated Jul. 21, 2022.
Chinese Office Action dated Dec. 27, 2022.
Indian Examination Report dated Jan. 23, 2023.

* cited by examiner

VISIBLE LIGHT BLOCKING LENS ASSEMBLY AND ELECTRONIC DEVICE INCLUDING THE SAME

CROSS-REFERENCE TO RELATED APPLICATION(S)

This application is based on and claims priority under 35 U.S.C. 119 to Korean Patent Application No. 10-2018-0139644, filed on Nov. 14, 2018, in the Korean Intellectual Property Office, the disclosure of which is herein incorporated by reference in its entirety.

BACKGROUND

1. Technical Field

One or more embodiments of the instant disclosure generally relate to an optical device. For example, in certain embodiments, there is a lens assembly including a plurality of lenses and an electronic device including the lens assembly.

2. Description of Related Art

Optical devices (e.g., camera capable of capturing image or video) have been widely used. Recently, digital cameras or video cameras having a solid-state image sensor (e.g., charge coupled device (CCD) or complementary metal-oxide semiconductor (CMOS) device), have been widely distributed. These solid-state image sensors have replaced film-type optical devices in certain applications due to easy image storage and reproduction as well as easy movement.

Recently, manufacturers of devices such as smartphones have been increasingly using a plurality of optical devices (e.g., a telephoto camera and a wide-angle camera) together in a single electronic device to improve the quality of captured images, and to provide various visual effects to the captured images. For example, images of a subject may be obtained via a plurality of cameras having different optical characteristics, and the images may be synthesized in order to acquire a processed image. Such optical devices may be mounted in an electronic device specialized for image-capturing such as a digital camera. Recently, these optical devices have also been mounted on miniaturized portable electronic devices, such as mobile communication terminals.

SUMMARY

As the use of electronic devices such as mobile communication terminals has become popular, the appearances of electronic devices are increasingly refined, satisfying user desire for good design and appearance. However, the optical device (e.g., the camera) of an electronic device is inevitably exposed so that it can receive light from the surrounding environment, and may thus be a hindrance to the designed appearance of the electronic device. Meanwhile, various functions such as object recognition, augmented reality, and three-dimensional scanning using an optical device are also incorporated in an electronic device, and thus, an additional optical device that detects distance information on a subject (e.g., depth) is miniaturized and may be mounted on the electronic device. However, the optical device for detecting distance information may also be exposed and thus it also disrupts the appearance of the electronic device.

According to an embodiment, a lens assembly may include: at least four lenses sequentially arranged along an optical axis from a subject to an image sensor. Among the at least four lenses, a first lens disposed closest to the subject may have a visible light transmittance ranging from 0% to 5%, and, among subject-side surfaces and image-sensor-side surfaces of remaining lenses other than the first lens, at least four surfaces may include an inflection point.

According to an embodiment, an electronic device may include: a first camera including a lens assembly, and configured to acquire first information on a subject based on light incident through the lens assembly; at least one second camera configured to second information on the subject different from the first information; and a processor or an image signal processor. The lens assembly may include at least four lenses sequentially arranged along an optical axis from the subject to an image sensor. Among the at least four lenses, a first lens disposed closest to the subject may have a visible light transmittance ranging from 0% to 5%, among subject-side surfaces and image-sensor-side surfaces of remaining lenses other than the first lens, at least four surfaces may include an inflection point, and the processor or the image signal processor may be configured to perform user authentication based on the first information.

According to an embodiment, among the lenses of the lens assembly, the first lens positioned closest to the subject may have a transmittance ranging from 0% to 5% with respect to visible light. Even if this lens assembly is mounted on an electronic device, the lens assembly may not be visually recognized by a user. In other words, the lens assembly may not be visually distinguishable from the rest of the exterior of the electronic device. Thus, the lens assembly according to certain embodiments is capable of being visually harmonious with the external appearance of the electronic device. According to an embodiment, the lens assembly includes at least four lenses, and at least four of the lens surfaces have an inflection point, whereby the lens assembly is capable of having a large-aperture characteristic while having a short total length. Accordingly, the lens assembly according to certain embodiments is capable of being easily mounted in a miniaturized electronic device.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of the disclosure will be more apparent from the following detailed description taken in conjunction with the accompanying drawings, in which:

FIG. 3;

DETAILED DESCRIPTION

Figure 1:
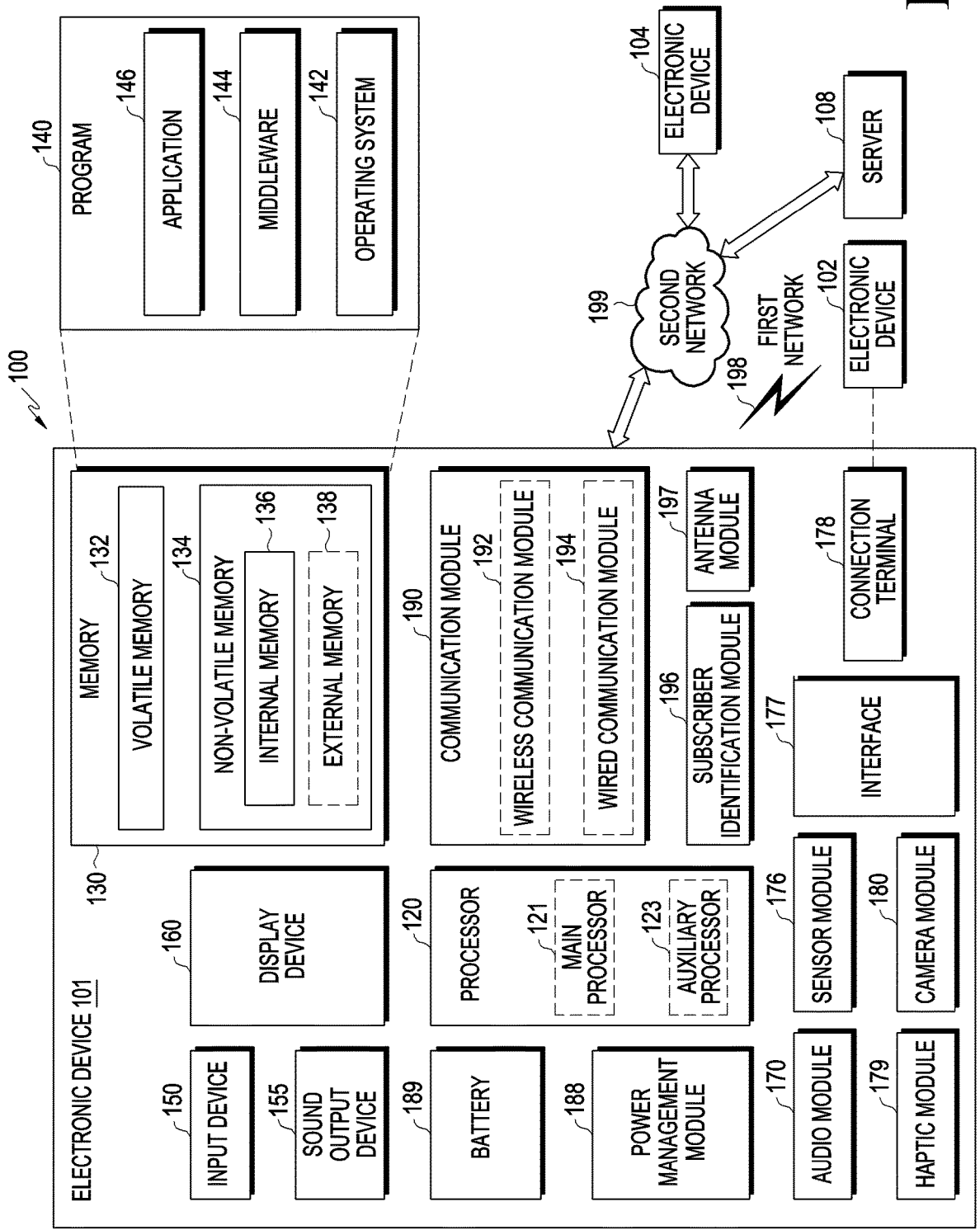
FIG. 1 is a block diagram of an electronic device according to various embodiments in a network environment.

As the disclosure allows for various changes and numerous embodiments, some exemplary embodiments will be described in detail with reference to the accompanying drawings. However, it should be understood that the disclosure is not limited to the specific embodiments, but the disclosure includes all modifications, equivalents, and alternatives within the spirit and the scope of the disclosure.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Although ordinal terms such as "first" and "second" may be used to describe various elements, these elements are not limited by the terms. The terms are used merely for the purpose to distinguish an element from the other elements. For example, a first element could be termed a second element, and similarly, a second element could be also termed a first element without departing from the scope of the disclosure. As used herein, the term "and/or" includes any and all combinations of one or more associated items. It is to be understood that if an element (e.g., first element) is referred to, with or without the term "operatively" or "communicatively", as "coupled with," or "connected with, ", it means that the element may be coupled with the other element directly (e.g., wiredly), wirelessly, or via a third element.

Further, the relative terms "a front surface," "a rear surface," "a top surface," "a bottom surface," and the like which are described with respect to the orientation in the drawings may be replaced by ordinal numbers such as first and second. In the ordinal numbers such as first and second, their order are determined in the mentioned order or arbitrarily and may not be arbitrarily changed if necessary.

In the disclosure, the terms are used to describe specific embodiments, and are not intended to limit the disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the disclosure belongs. Such terms as those defined in a generally used dictionary are to be interpreted to have the meanings equal to the contextual meanings in the relevant field of art, and are not to be interpreted to have ideal or excessively formal meanings unless clearly defined in the specification.

In the disclosure, an electronic device may be a random device, and the electronic device may be called a terminal, a portable terminal, a mobile terminal, a communication terminal, a portable communication terminal, a portable mobile terminal, a touchscreen, or the like.

For example, the electronic device may be a smartphone, a portable phone, a game player, a TV, a display unit, a heads-up display unit for a vehicle, a notebook computer, a laptop computer, a tablet Personal Computer (PC), a Personal Media Player (PMP), a Personal Digital Assistants (PDA), and the like. The electronic device may be implemented as a portable communication terminal which has a wireless communication function and a pocket size. Further, the electronic device may be a flexible device or a flexible display device.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a Local Area Network (LAN), a Wireless Local Area Network (WLAN), a Wide Area Network (WAN), an Internet, a Small Area Network (SAN) or the like, but is not limited thereto.

According to certain embodiments, it is possible to provide a lens assembly implementing an optical device that detects distance information on a subject while being in visual harmony with the outside appearance of an electronic device.

According to certain embodiments, it is possible to provide a lens assembly that is easily mounted on the miniaturized electronic device.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing recordings, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
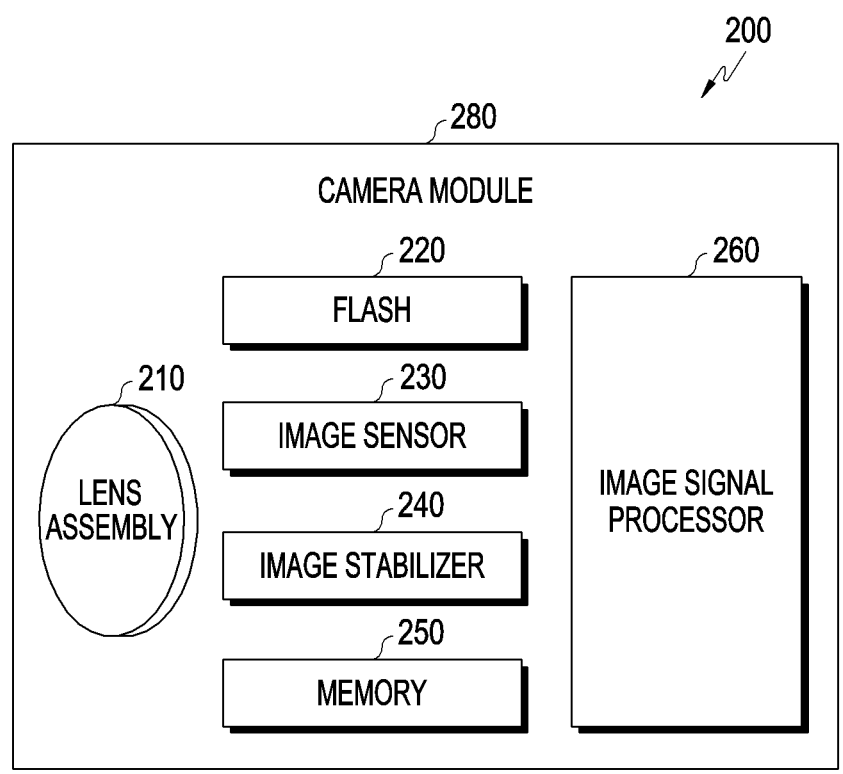
FIG. 2 is a block diagram exemplifying a camera module according to various embodiments.

FIG. 2 is a block diagram 200 illustrating the camera module 280 according to various embodiments. Referring to FIG. 2, the camera module 280 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 280 may include a plurality of lens assemblies 210. In such a case, the camera module 280 may form, for example, a dual camera, a 360-degree camera, or a spherical camera. Some of the plurality of lens assemblies 210 may have the same lens attribute (e.g., view angle, focal length, autofocusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 280 or the electronic device 201 including the camera module 280. This allows compensating for at least part of a negative effect (e.g., image blurring) by the movement on an image being captured. According to an embodiment, the image stabilizer 240 may sense such a movement by the camera module 280 or the electronic device 101 using a gyro sensor (not shown) or an acceleration sensor (not shown) disposed inside or outside the camera module 280. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 280. An image processed by the image signal processor 260 may be stored back in the memory 250 for further processing, or may be provided to an external component (e.g., the memory 130, the display device 160, the electronic device 102, the electronic device 104, or the server 108) outside the camera module 280. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 280 having different attributes or functions. In such a case, at least one of the plurality of camera modules 280 may form, for example, a wide-angle camera and at least another of the plurality of camera modules 280 may form a telephoto camera. Similarly, at least one of the plurality of camera modules 280 may form, for example, a front camera and at least another of the plurality of camera modules 280 may form a rear camera.

Figure 3:
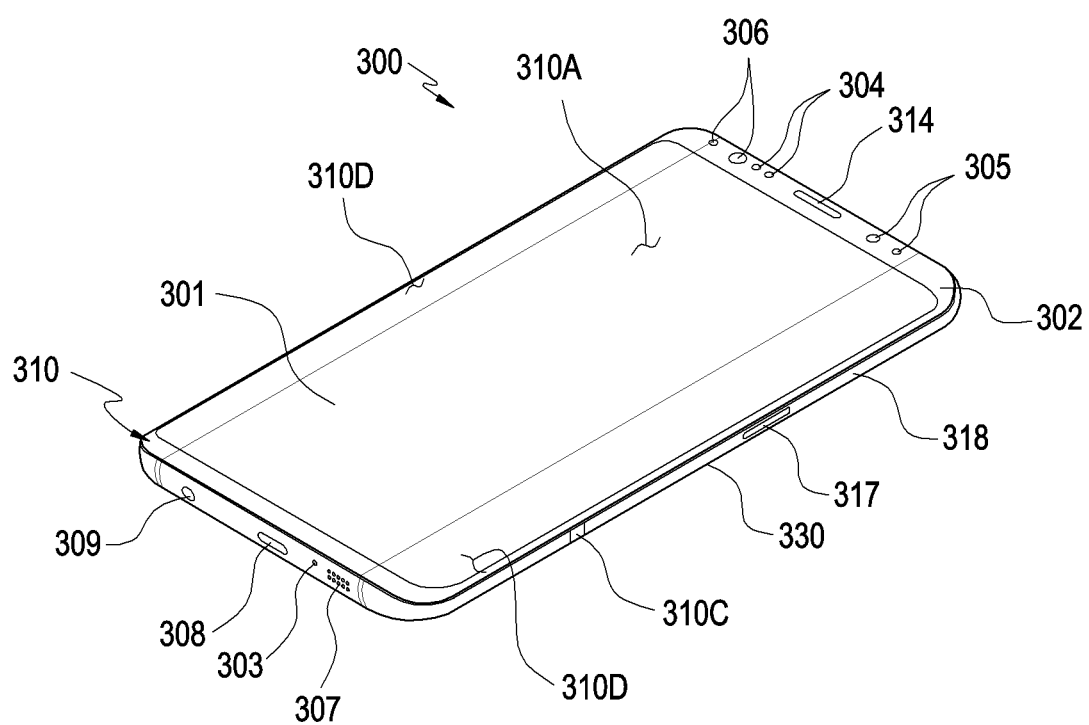
FIG. 3 is a perspective view illustrating the front face of an electronic device according to an embodiment.
Figure 4:
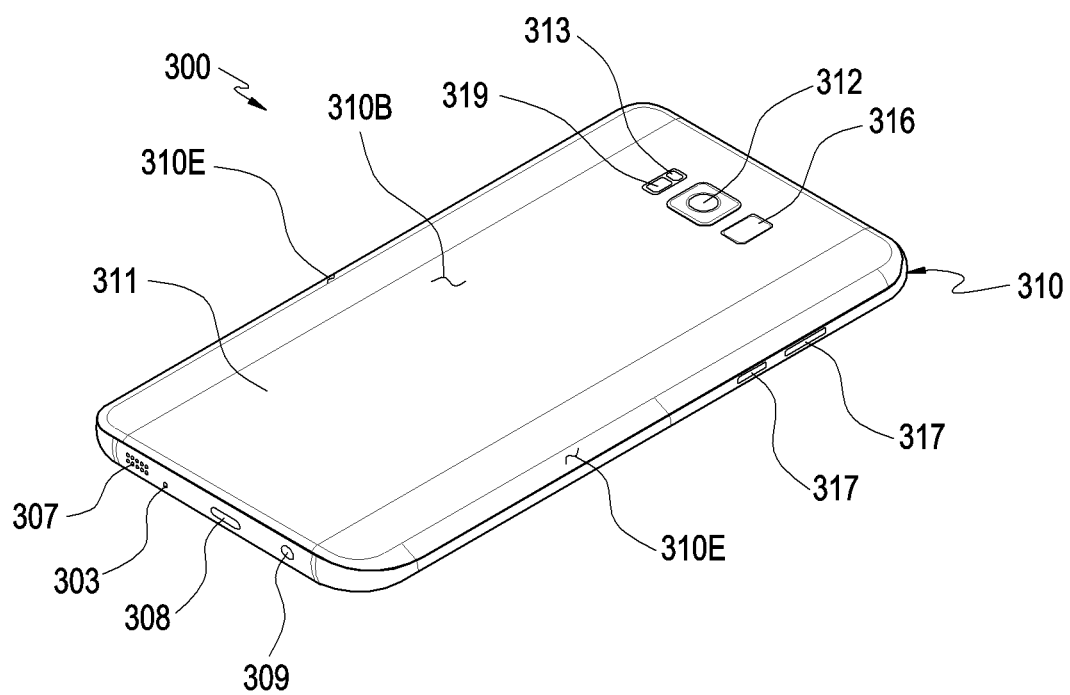
FIG. 4 is a perspective view illustrating the rear face of the electronic device illustrated

FIG. 3 is a perspective view illustrating the front face of an electronic device 300 (e.g., the electronic device 101 in FIG. 1) according to an embodiment. FIG. 4 is a perspective view illustrating the rear face of the electronic device 300 illustrated FIG. 3.

Referring to FIGS. 3 and 4, the electronic device 300 (e.g., the electronic device 101 in FIG. 1) according to an embodiment may include a housing 310 having a first face (or a front face) 310A, a second face (or a rear face) 310B, and a side face 310C surrounding a space between the first face 310A and the second face 310B. In another embodiment (not illustrated), the term "housing 310" may refer to a structure forming a part of the first face 310A, the second face 310B, and the side face 310C of FIG. 3. According to an embodiment, at least a portion of the first face 310A may be made of a substantially transparent front plate 302 (e.g., a glass plate or a polymer plate including various coating layers). In another embodiment, the front plate 302 is coupled to the housing 310 to form an inner space within the housing 310. In certain embodiments, the term "inner space" may mean the inner space defined by the outer edges of the housing 310, which accommodates at least a part of the display 301 to be described later or the display device 160 in FIG. 1.

According to an embodiment, the second face 310B may be formed by a substantially opaque rear plate 311. The rear plate 311 may be made of, for example, coated or colored glass, ceramic, polymer, or metal (e.g., aluminum, stainless steel (STS), magnesium, etc.), or a combination of two or more of these materials. The side face 310C may be formed by a side bezel structure (or a "side member") 318 coupled to the front plate 302 and the rear plate 311, and the side bezel structure may also be made of metal and/or polymer. In an embodiment, the rear plate 311 and the side bezel structure 318 may be integrally formed, and may be made of the same material (e.g., metal such as aluminum).

In the illustrated embodiment, the front plate 302 may include, at the long opposite side edges thereof, two first areas 310D, which are bent and extend seamlessly from the first face 310A toward the rear plate 311. In the illustrated embodiment (see FIG. 4), the rear plate 311 may include, at the long opposite side edges thereof, two second areas 310E, which are bent and extend seamlessly from the second face 310B toward the front plate 302. In an embodiment, the front plate 302 (or the rear plate 311) may include only one of the first regions 310D (or the second regions 310E). In another embodiment, some of the first areas 310D and the second areas 310E may not be included. In the above embodiment, when viewed from the side of the electronic device 300, the side bezel structure 318 may have a first thickness (or width) on the side face in which the first areas 310D or the second areas 310E are not included (e.g., the side face in which the connector hole 308 is formed) and may have a second thickness, which is thinner than the first thickness, on the side face in which the first areas 310D or the second areas 310E are included (the side face in which the key input device 317 is disposed).

According to an embodiment, the electronic device 300 may include at least one of a display 301, audio modules 303, 307, and 314, sensor modules 304, 316, and 319, camera modules 305, 312, and 313, key input devices 317, light-emitting elements 306, and connector holes 308 and 309. In an embodiment, at least one of the components (e.g., the key input devices 317 or the light-emitting elements 306) may be omitted from the electronic device 300, or the electronic device 300 may additionally include the other components.

The display 301 (e.g., the display device 160 in FIG. 1) may be exposed through a substantial portion of, for example, the front plate 302. In an embodiment, at least a part of the display 301 may be exposed through the front plate 302 forming the first face 310A and the first areas 310D. In an embodiment, the edges of the display 301 may be formed have substantially the same contour shape as that of the front plate 302 adjacent thereto. In another embodiment (not illustrated), the distance between the outer contour of the display 301 and the outer contour of the front plate 302 may be substantially constant in order to enlarge the exposed area of the display 301.

In another embodiment (not illustrated), a recess or an opening may be formed in a part of the screen display area (e.g., the active area) of the display 301 or an area outside the screen display area (e.g., the inactive area), and at least one of the audio module 314 (e.g., the audio module 170 in FIG. 1), the sensor module 304 (e.g., the sensor module 176 in FIG. 1), the camera module 305 (e.g., the camera module 180), and the light-emitting element 306 may be aligned with the recess or the opening. In another embodiment (not illustrated), at least one of the audio module 314, the sensor module 304, the camera module 305, the fingerprint sensor 316, and the light-emitting element 306 may be disposed behind the screen display area of the display 301. In another embodiment (not illustrated), the display 301 may be coupled to or disposed adjacent to a touch-sensing circuit, a pressure sensor that is capable of measuring the intensity of a touch (pressure), and/or a digitizer that detects a magnetic-field-type stylus pen. In some embodiments, at least some of the sensor modules 304 and 319 and/or at least some of the key input devices 317 may be disposed in the first areas 310D and/or the second areas 310E.

The audio modules 303, 307, and 314 may include a microphone hole 303 and speaker holes 307 and 314. The microphone hole 303 may include a microphone disposed therein so as to acquire sound from the external environment. In an embodiment, multiple microphones may be disposed therein so as to detect the direction of sound. The speaker holes 307 and 314 may include an external speaker hole 307 and a phone call receiver hole 314. In some embodiments, the speaker holes 307 and 314 and the microphone hole 303 may be implemented as a single hole, or a speaker, such as a piezo speaker, may be included without the speaker holes 307 and 314.

The sensor modules 304, 316, and 319 may generate electrical signals or data values corresponding to various internal operating states or various external environmental conditions of the electronic device 300. The sensor modules 304, 316, and 319 may include, for example, a first sensor module 304 (e.g., a proximity sensor) and/or a second sensor module (not illustrated) (e.g., a fingerprint sensor) disposed on the first face 310A of the housing 310, and/or a third sensor module 319 (e.g., an HRM sensor) and/or a fourth sensor module 316 (e.g., a fingerprint sensor) disposed on the second face 310B of the housing 310. The fingerprint sensor may be disposed not only on the first face 310A (e.g., the display 301) of the housing 310, but also on the second face 310B. The electronic device 300 may further include at least one of sensor modules (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312, and 313 may include a first camera device 305 disposed on the first face 310A of the electronic device 300, a second camera device 312 disposed on the second surface 310B, and/or a flash 313. The camera modules 305 and 312 may include one or more lenses, an image sensor, and/or an image signal processor. The flash 313 may include, for example, a light-emitting diode or a xenon lamp. In an embodiment, two or more lenses (e.g., an infrared camera lens, a wide-angle lens, and a telephoto lens) and image sensors may be disposed on one face of the electronic device 300.

The key input devices 317 may be disposed on the side face 310C of the housing 310. In another embodiment, the electronic device 300 may not include some or all of the above-mentioned key input devices 317, and the omitted key input device 317 may be implemented in another form such as a soft key or the like on the display 301. In some embodiments, the key input devices 317 may be integrated with the sensor module 316.

The light-emitting element 306 may be disposed, for example, on the first face 310A of the housing 310. The light-emitting element 306 may optically provide, for example, status information of the electronic device 300. In another embodiment, the light-emitting element 306 may provide a light source that cooperates with, for example, the camera module 305. The light-emitting element 306 may include, for example, an LED, an IR LED, and a xenon lamp.

The connector holes 308 and 309 may include a first connector hole 308 that is capable of accommodating a connector (e.g., a USB connector) for transmitting and receiving power and/or data to and from an external electronic device, and/or a second connector hole 309 that is capable of accommodating a connector (e.g., an earphone jack) for transmitting and receiving an audio signal to and from an external electronic device.

Figure 5:
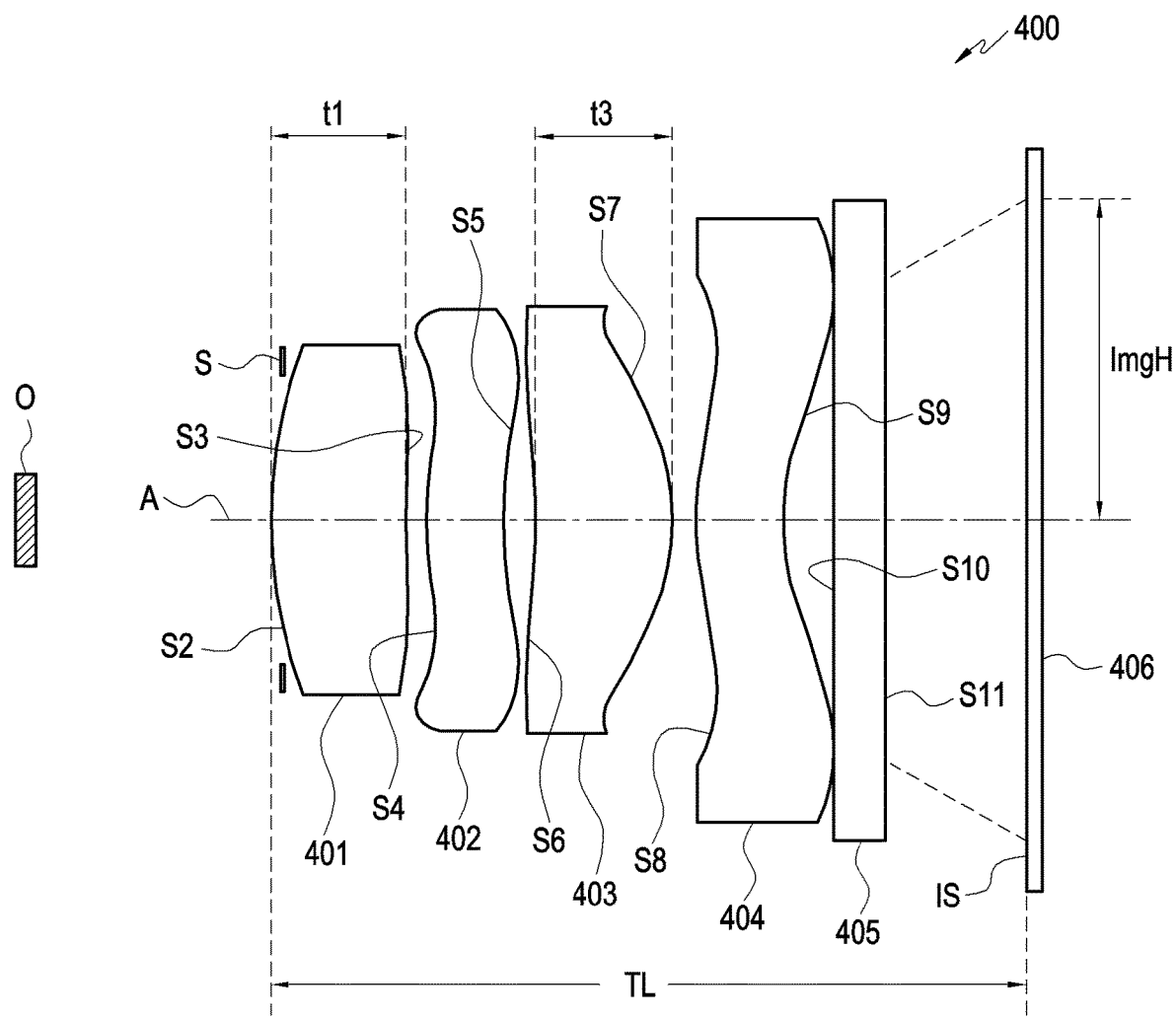
FIG. 5 is a configuration view illustrating a lens assembly according to one of various embodiments.

FIG. 5 is a configuration view illustrating a lens assembly 400 according to one of various embodiments.

Referring to FIG. 5, according to one of various embodiments, the lens assembly 400 (e.g., the lens assembly 210 in FIG. 2) may include a plurality of lenses 401, 402, 403, and 404, and may further include an image sensor 406 in this embodiment. For example, the image sensor 406 may be mounted in an electronic device (e.g., the electronic devices 101 and 300 in FIG. 1 or FIG. 3) or an optical device (e.g., the camera module 280 in FIG. 2), and the plurality of lenses 401, 402, 403, and 404 constituting the lens assembly 400 may be mounted in the electronic device or the optical device and be aligned with the image sensor 406. In an embodiment, the lens assembly 400 may be disposed in any one of the camera modules 305, 312, and 313 of FIG. 3 or FIG. 4.

According to an embodiment, the plurality of lenses 401, 402, 403, and 404 may include a first lens 401, a second lens 402, a third lens 403, and/or a fourth lens 404, which are sequentially disposed from the subject O side toward the image sensor 406. For example, the first to fourth lenses 401, 402, 403, and 404 may be aligned on the optical axis A together with the image sensor 406. In another embodiment, a plurality of second lenses 402 may be provided, and the first to fourth lenses 401, 402, 403, and 404 may each be a plastic aspheric lens. In an embodiment, the first lens 401 may have a transmittance ranging from 0% to 5% with respect to visible light. This way, even if the lens assembly 400 is mounted in the electronic device 300 illustrated in FIG. 3, the user may not visually recognize the lens assembly 400 when viewing the exterior of the electronic device 300. In an embodiment, when actually manufactured, the first lens 401 may not completely block visible light. For example, even if the design specification for visible light transmittance is 0%, an actually manufactured first lens 401 may have a transmittance of about 0.001% with respect to visible light.

According to an embodiment, the first lens 401 may have a positive refractive index, and may be disposed on the subject O side to face, for example, the subject O with a diaphragm S interposed therebetween. Since the first lens 401 has a positive refractive index, it is possible to reduce the total length (TL) of the lens assembly 400 (e.g., the distance from the subject-side surface S2 of the first lens 401 to the imaging surface IS of the image sensor 406) and/or the outer diameters of the second to fourth lenses 402, 403, and 404. In an embodiment, the first lens 401 may be a meniscus lens that is convex toward the subject O side, and the image sensor 406 side surface S3 of the first lens 401 may have an inflection point. For example, on the image sensor 406 side surface S3 of the first lens 401, there may be an inflection shape in which a central portion aligned on the optical axis A is concave and a peripheral portion at an edge side is convex. The first lens 401 having the shape as described above may enable the lens assembly 400 to form a large-aperture optical system having an F-number ranging from 1.1 to 1.7. In an embodiment, the first lens 401 having the shape and the positive refractive index as described above may facilitate miniaturization of the lens assembly 400 or correction of spherical aberration.

According to an embodiment, the first lens 401 may have a transmittance of 5% or less with respect to visible light and may be made of a material optimized for near infrared rays. Thus, the first lens 401 may have low visible light reflectance to alleviate or prevent visual recognition by the user. In an embodiment, in mounting the lens assembly 400 in the electronic device (e.g., the electronic device 300 in FIG. 3), a color (e.g., black) material, which matches the color of the device's exterior, may be provided. Therefore, it is possible to alleviate or prevent deterioration of the appearance of the electronic device even though the electronic device is mounted with this lens assembly or optical device.

According to an embodiment, the second lens 402 has a positive refractive index, and may be disposed adjacent to the first lens 401. In some embodiments, a plurality of the second lenses 402 may be disposed between the first lens 401 and the third lens 403, which will be described later in more detail with reference to FIG. 11. The second lens 402 may be a meniscus lens that is convex toward the subject O side, and the subject-side surface S4 and the image-sensor-side surface S5 may both include an inflection point.

According to an embodiment, the third lens 403 may have a positive refractive index, and may be disposed adjacent to the second lens 402. According to an embodiment, the third lens 403 may be a meniscus lens that is convex toward the image sensor 406 side, and the subject-side surface S6 and the image-sensor-side surface S7 may both include an inflection point.

According to an embodiment, the fourth lens 404 may have a negative refractive index, and may be disposed adjacent to the third lens 403. In an embodiment, the fourth lens 404 may be a meniscus lens that is convex toward the subject O side, and the subject-side surface S8 and the image-sensor-side surface S9 may both include an inflection point. Since the fourth lens 404 has a negative refractive index, the incident angle of the peripheral portion of the image formed on the imaging surface IS may be at an angle of 30 degrees or more. Accordingly, the back focal length (BFL) of the lens assembly 400 may be reduced to reduce the total length of the lens assembly 400.

According to an embodiment, among the first to fourth lenses 401, 402, 403, and 404, at least four of the lens surfaces of the second lens 402, the third lens 403, and/or the fourth lens 404 (e.g., the subject-side surfaces S4, S6, and S8 and the image-sensor-side surfaces S5, S7, and S9) may include an inflection point. Since a plurality of lens surfaces include an inflection point, the lens assembly 400 may be implemented as a large-aperture optical system, and this may facilitate aberration correction of the lens assembly 400. In an embodiment, the light beams formed on the peripheral portion of the imaging plane IS of the image sensor 406 through the combination of the refractive indexes and the shapes of the first to fourth lenses 401, 402, 403, and 404 have an incident angle of about 30 degrees. The lens assembly 400 may secure an angle of view of 70 degrees or more. In an embodiment, at least the second to fourth lenses 402, 403, and 404 may be plastic to facilitate molding or processing of the lenses into the designed shapes. In some embodiments, when a plurality of second lenses 402 are arranged, aberration correction may be made easier, and the resolution of the optical device (e.g., a camera or an electronic device including the lens assembly 400) may be increased.

According to an embodiment, all of the first to fourth lenses 401, 402, 403, and 404 may be meniscus lenses. In a lens assembly including four or five lenses, when at least four lenses are meniscus lenses, even if the focal length of the lens assembly is small, the total length of the lens assembly may be miniaturized, and aberration correction may be good. For example, the lens assembly 400 may be miniaturized and may have high optical performance while being implemented with four or five lenses.

According to an embodiment, the lens assembly 400 may include a band-pass filter 405. For example, the band-pass filter 405 may be disposed between the fourth lens 404 and the image sensor 406. In an embodiment, the band-pass filter 405 substantially blocks visible light (e.g., having visible light transmittance ranging from 0% to 1%), and may have a transmittance ranging from 90% to 99% with respect to light having a wavelength between 800 nm and 1000 nm (e.g., near infrared light). As the band-pass filter 405 is disposed as described above, light incident on the image sensor 406 may be substantially limited to light in the near infrared region. In some embodiments, the band-pass filter 405 may not completely block visible light when the band-pass filter is actually manufactured. For example, even if the design specification for visible light transmittance is 0%, an actually band-pass filter 405 may have a transmittance of about 0.001% with respect to visible light.

According to an embodiment, the band-pass filter 405 may transmit light having a specific wavelength between 800 nm and 1000 nm. For example, the light having the specific wavelength transmitted by the band-pass filter 405 may have at least one of wavelengths of 850±5 nm, 940±5 nm, or 980±5 nm. In another embodiment, the band-pass filter 405 may block light whose wavelengths are outside the transmission range. Herein, although the specific wavelengths of the light transmitted by the band-pass filter 405 are disclosed, these specific numerical value are only used as examples and the disclosure is not so limited to these numerical values. The band-pass filter 405 may be designed or manufactured to have appropriate optical characteristics depending on the required specifications of the lens assembly 400 or the camera module or the electronic device including the lens assembly 400.

According to an embodiment, the electronic device (e.g., the electronic device 300 in FIG. 3) in which the lens assembly 400 is mounted may emit light having a near infrared wavelength using at least a part of a light source device (e.g., the light-emitting device 306 in FIG. 3). In some embodiments, this light source device is embedded in a camera module (e.g., the camera module 280 in FIG. 2) itself, or may be disposed adjacent to the camera module (e.g., the camera module 305 in FIG. 3) separately from the camera module.

According to an embodiment, the light source device (e.g., the light-emitting device 306 in FIG. 3) may include an infrared-emitting diode or a near infrared laser light source. The light emitted from the light source device may be reflected by the subject O and may be incident on the image sensor 406 through the lens assembly 400. Based on the time taken for the reflected light to reach the image sensor 406, the electronic device (e.g., the processor 120 in FIG. 1 or the image signal processor 260 in FIG. 2) may detect first information (e.g., distance information of the subject O relative to the electronic device (e.g., depth information)). For example, the lens assembly 400 may include the band-pass filter 405, thereby constituting a near infrared camera that suppresses interference of visible light or infrared rays having wavelengths not needed for detection of distance information of the subject. The processor (e.g. the processor 120 in FIG. 1 or the image signal processor 260 in FIG. 2) may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the lens assembly 400 may satisfy Equation 1 as follows.

$$1.5 =< TL/ImgH =< 3.5 \quad \text{[Equation 1]}$$

Here, "TL" may represent the total length of the lens assembly 400 (e.g., the distance from the subject-side surface S2 of the first lens 401 to the imaging surface IS of the image sensor 406), and "ImgH" may represent the maximum image height of an image formed on the imaging surface IS. The term "image height" means the maximum distance from the edge of an image formed on the imaging surface IS to the optical axis A. When the ratio of the total length TL to the maximum image height ImgH exceeds 3.5, this means that the total length is relatively long, and thus the lens assembly 400 may be difficult to be mounted in a miniaturized electronic device. When the ratio of the total length TL to the maximum image height ImgH does not reach 1.5, this means that the total length of the lens assembly 400 may be too short, thereby limiting the number of lenses. When the number of lenses is limited, the number of lens surfaces including an inflection point is also reduced, and thus aberration correction may be limited. When Equation 1 is satisfied, the lens assembly 400 may have a total length of about 3 mm while being implemented with four or five lenses, and may be easily mounted in a miniaturized electronic device while ensuring good performance of the optical device (e.g., the camera module 280).

Since the optical device including the lens assembly 400 is able to detect distance information on a subject or a specific portion of the subject, or the like, the optical device may be used as part of a security camera, an object recognition camera, an object recognition or user authentication camera, or a thermal imaging camera, and may be combined with other optical devices (e.g., a telephoto camera or a wide-angle camera) so as to provide functions such as augmented reality and three-dimensional scanner functions in small electronic devices such as mobile communication terminals. In some embodiments, the optical device including the lens assembly 400 as described above may be implemented to include at least some of the components of the camera module 280 of FIG. 2.

According to an embodiment, the lens assembly 400 may satisfy Equation 2 as follows.

$$1 =< f_1/f =< 10 \quad \text{[Equation 2]}$$

Here, "$f_1$" may represent the focal length of the first lens 401, and "f" may represent the total focal length of the lens assembly 400. When the ratio of the focal length $f_1$ of the first lens 401 to the total focal length f of the lens assembly 400 exceeds 10, the miniaturization of the lens assembly 400 may be limited, and when the ratio does not reach 1, it may be difficult to manufacture or combine lenses that satisfy designed characteristics. For example, the lens assembly 400 according to an embodiment may be easily manufactured or combined with lenses 401, 402, 403, and 404 while being miniaturized.

According to an embodiment, the lens assembly 400 may satisfy Equation 3 as follows.

$$0.15 =< t_{max}/f =< 0.5 \quad \text{[Equation 3]}$$

Here, "$t_{max}$" may represent the center thickness of the lens having the greatest thickness, and "f" may represent the total focal length of the lens assembly 400. The "center thickness" may mean the thickness of each of the first to fourth lenses 401, 402, 403, and 404 in the optical axis A, and may be denoted by "$t_n$" (wherein "n" is a natural number). For example, "$t_1$" in FIG. 4 may represent the center thickness of the first lens 401, and in the lens assembly 400 illustrated in FIG. 4, the center thickness $t_3$ of the third lens 403 is 0.552388, which may be the greatest. In an embodiment, the total focal length of the lens assembly 400 is 1.921, and the ratio of the maximum center thickness $t_{max}$ to the focal length f may satisfy Equation 3. When the ratio of the maximum center thickness $t_{max}$ to the total focal length f of the lens assembly 400 exceeds 0.5, the miniaturization of the lens assembly 400 may be limited due to the thickness of the lens, and when the ratio does not reach 0.15, it may be difficult to manufacture the lens assembly that satisfies designed characteristics. For example, the lens assembly 400 according to an embodiment may be easily manufactured or combined with lenses 401, 402, 403, and 404 while being miniaturized.

Lens data of the lens assembly 400 are shown in Table 1 below, in which "aperture stop" may indicate an opening surface of the diaphragm S, and "S2 to S11" may indicate the surfaces of the respective lenses 401, 402, 403, and 404 and/or the band-pass filter 405. The lens assembly 400 has a focal length of 1.921 mm, an F-number of 1.64, an angle of view of 75 degrees, and a maximum image height of 1.5 mm, and may satisfy at least one of the above-described equations.

TABLE 1

| Surface | Radius of curvature | Thickness or air gap | Refractive index | Abbe number |
| --- | --- | --- | --- | --- |
| aperture stop | INFINITY | −0.050000 | | |
| S2 | 1.71578 | 0.542101 | 1.582500 | 30.1900 |
| S3 | 2.59495 | 0.086005 | | |

TABLE 1-continued

| Surface | Radius of curvature | Thickness or air gap | Refractive index | Abbe number |
| --- | --- | --- | --- | --- |
| S4 | 1.39349 | 0.309338 | 1.635505 | 23.9010 |
| S5 | 1.93557 | 0.134074 | | |
| S6 | −2.32654 | 0.552388 | 1.635505 | 23.9010 |
| S7 | −0.96629 | 0.100000 | | |
| S8 | 1.16965 | 0.350000 | 1.635505 | 23.9010 |
| S9 | 0.80573 | 0.212957 | | |
| S10 | INFINITY | 0.210000 | 1.516798 | 64.1983 |
| S11 | INFINITY | 0.575000 | | |
| image surface | INFINITY | | | |

Aspherical coefficients of the first to fourth lenses 401, 402, 403, and 404 are shown in Tables 2 and 3 below in which the aspherical coefficients may be calculated through Equation 4 as follows.

$$x = \frac{c'y^2}{1+\sqrt{1-(K+1)c'^2 y^2}} + Ay^4 + By^6 +$$
$$Cy^8 + Dy^{10} + Ey^{12} + Fy^{14} + Gy^{16} + Hy^{18} + Jy^{20}$$

[Equation 4]

Here, "x" may represent the distance from a lens vertex in the direction of the optical axis A, "y" may represent the distance in the direction perpendicular to the optical axis A, "c" may represent the inverse of the radius of curvature at the vertex of the lens, "K" may represent a Conic constant, and "A," "B," "C," "D," "E," "F," "G," "H," and "J" may represent aspheric coefficients, respectively.

TABLE 2

| | S2 | S3 | S4 | S5 |
| --- | --- | --- | --- | --- |
| K | −99.000000 | 10.378418 | −8.636931 | 1.314602 |
| A | 0.182436E+01 | −0.591959E+00 | −0.227167E+00 | 0.232548E+00 |
| B | −0.158916E+02 | −0.325118E+01 | −0.341451E+01 | −0.253700E+01 |
| C | 0.100487E+03 | 0.284453E+02 | 0.107911E+02 | 0.168462E+01 |
| D | −0.430830E+03 | −0.144168E+03 | −0.304075E+02 | 0.155140E+02 |
| E | 0.121683E+04 | 0.481397E+03 | 0.100819E+03 | −0.550828E+02 |
| F | −0.222664E+04 | −0.105573E+04 | −0.266383E+03 | 0.810567E+02 |
| G | 0.253624E+04 | 0.145083E+04 | 0.452565E+03 | −0.583465E+02 |
| H | −0.162931E+04 | −0.111587E+04 | −0.422345E+03 | 0.178095E+02 |
| J | 0.449670E+03 | 0.365391E+03 | 0.165255E+03 | −0.898805E+00 |

TABLE 3

| | S6 | S7 | S8 | S9 |
| --- | --- | --- | --- | --- |
| K | −56.769953 | −7.707943 | 0.111614 | −2.146231 |
| A | −0.308161E−01 | −0.886176E+00 | −0.853398E+00 | −0.465917E+00 |
| B | 0.175201E+01 | 0.196136E+01 | 0.149970E+01 | −0.156316E+00 |
| C | −0.126893E+02 | −0.317631E+00 | −0.783564E+01 | 0.264827E+01 |
| D | 0.489301E+02 | −0.189369E+02 | 0.309094E+02 | −0.716632E+01 |
| E | −0.111380E+03 | 0.782428E+02 | −0.766578E+02 | 0.106322E+02 |
| F | 0.155315E+03 | −0.157127E+03 | 0.117704E+03 | −0.961967E+01 |
| G | −0.129721E+03 | 0.180423E+03 | −0.109170E+03 | 0.526560E+01 |
| H | 0.593016E+02 | −0.112294E+03 | 0.560674E+02 | −0.160148E+01 |
| J | −0.114332E+02 | 0.290752E+02 | −0.122650E+02 | 0.207401E+00 |

Figure 6:
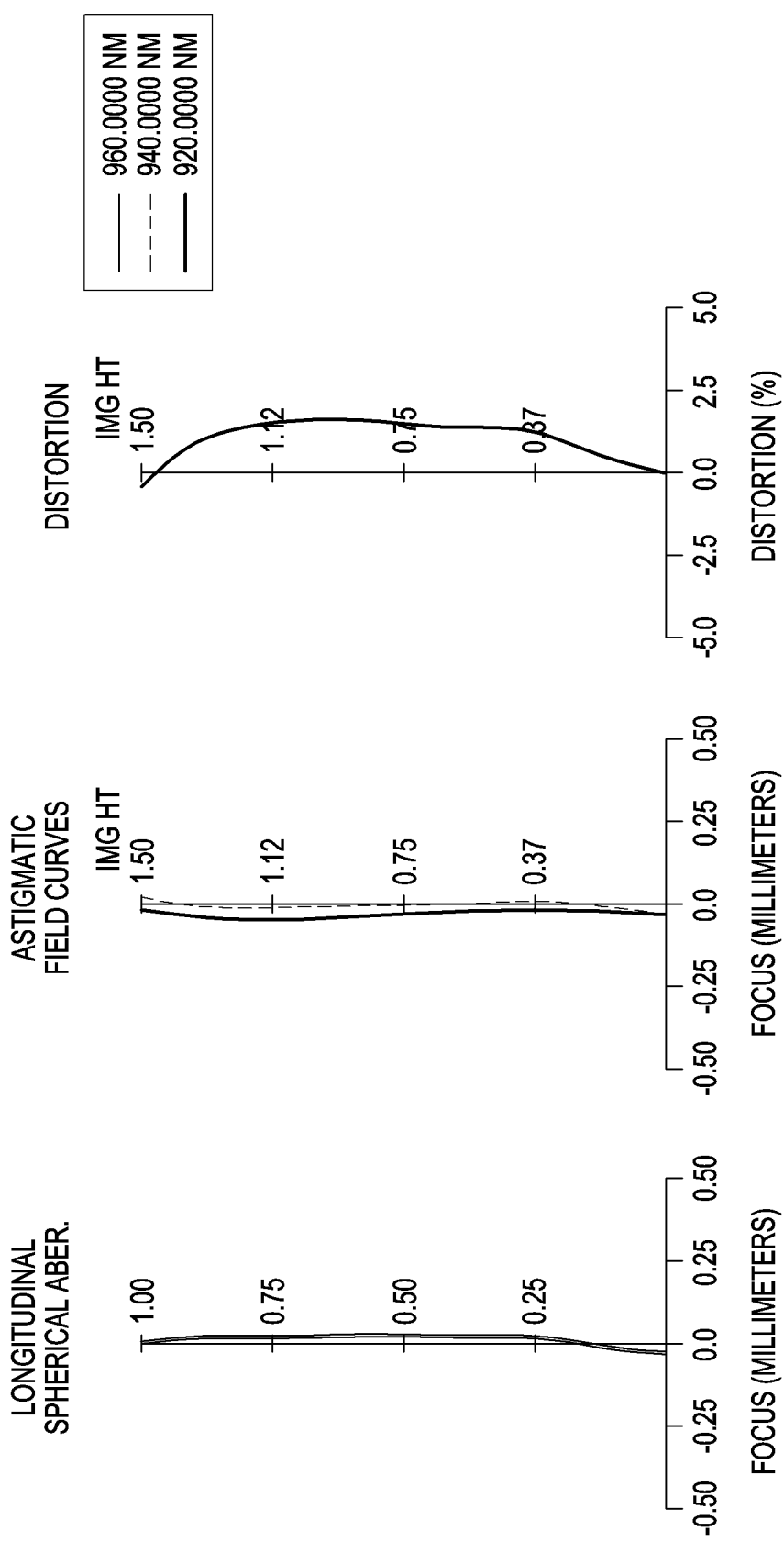
FIG. 6A is a graph representing the spherical aberration of the lens assembly according to one of various embodiments.
FIG. 6B is a graph representing the astigmatism of the lens assembly according to one of various embodiments.
FIG. 6C is a graph illustrating the distortion rate of the lens assembly according to one of various embodiments.

FIG. 6A is a graph representing the spherical aberration of the lens assembly (e.g., the lens assembly 400 in FIG. 5) according to one of various embodiments, FIG. 6B is a graph representing the astigmatism of the lens assembly (e.g., the lens assembly 400 in FIG. 5) according to one of various embodiments, and FIG. 6C is a graph illustrating the distortion rate of the lens assembly (e.g., the lens assembly 400 in FIG. 5) according to one of various embodiments.

FIG. 6A is a graph representing the spherical aberration of the lens assembly 400 according to one of various embodiments, in which the horizontal axis represents a longitudinal spherical aberration coefficient and the vertical axis represents a normalized distance from the center of an optical axis. FIG. 6A shows the change in longitudinal spherical aberration depending on wavelengths of light.

FIG. 6B is a graph representing the astigmatism of the lens assembly 400 according to one of various embodiments, and FIG. 6C is a graph illustrating the distortion rate of the lens assembly 400 according to one of various embodiments.

Referring to FIG. 6C, an image captured through the lens assembly 400 may have some distortion generated at a point deviated from the optical axis A, but such distortion ordinarily occurs in an optical device that uses an optical lens or a lens assembly. The short focus lens optical system may provide a good optical characteristic with a distortion rate of about 1%.

In the following detailed description, the components, which can be easily understood through the preceding embodiment, may be denoted by the same reference numerals as the preceding embodiments or the reference numerals may be omitted, and the detailed descriptions thereof may also be omitted.

Figure 7:
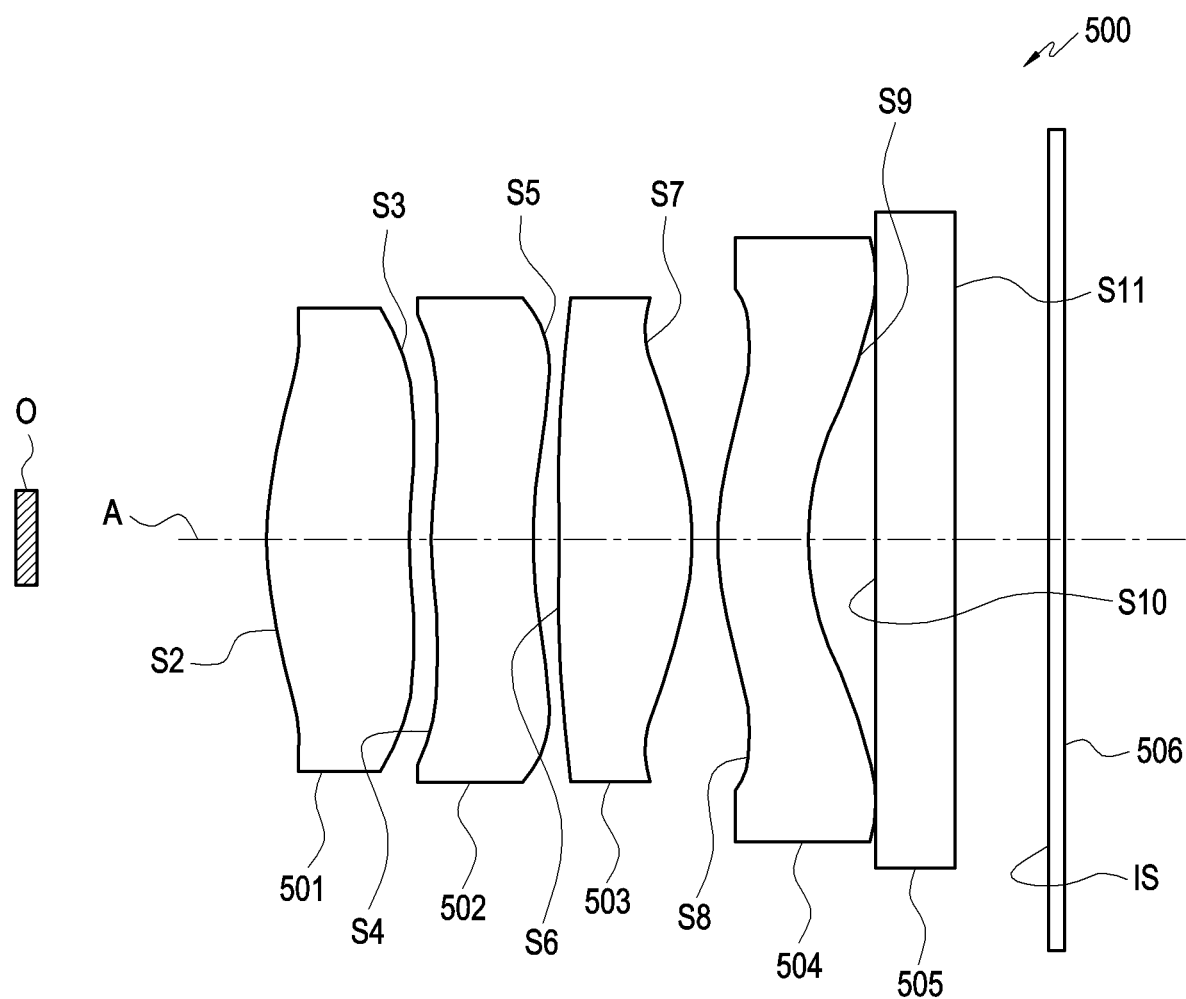
FIG. 7 is a view illustrating the configuration of a lens assembly according to another one of various embodiments.
Figure 8:
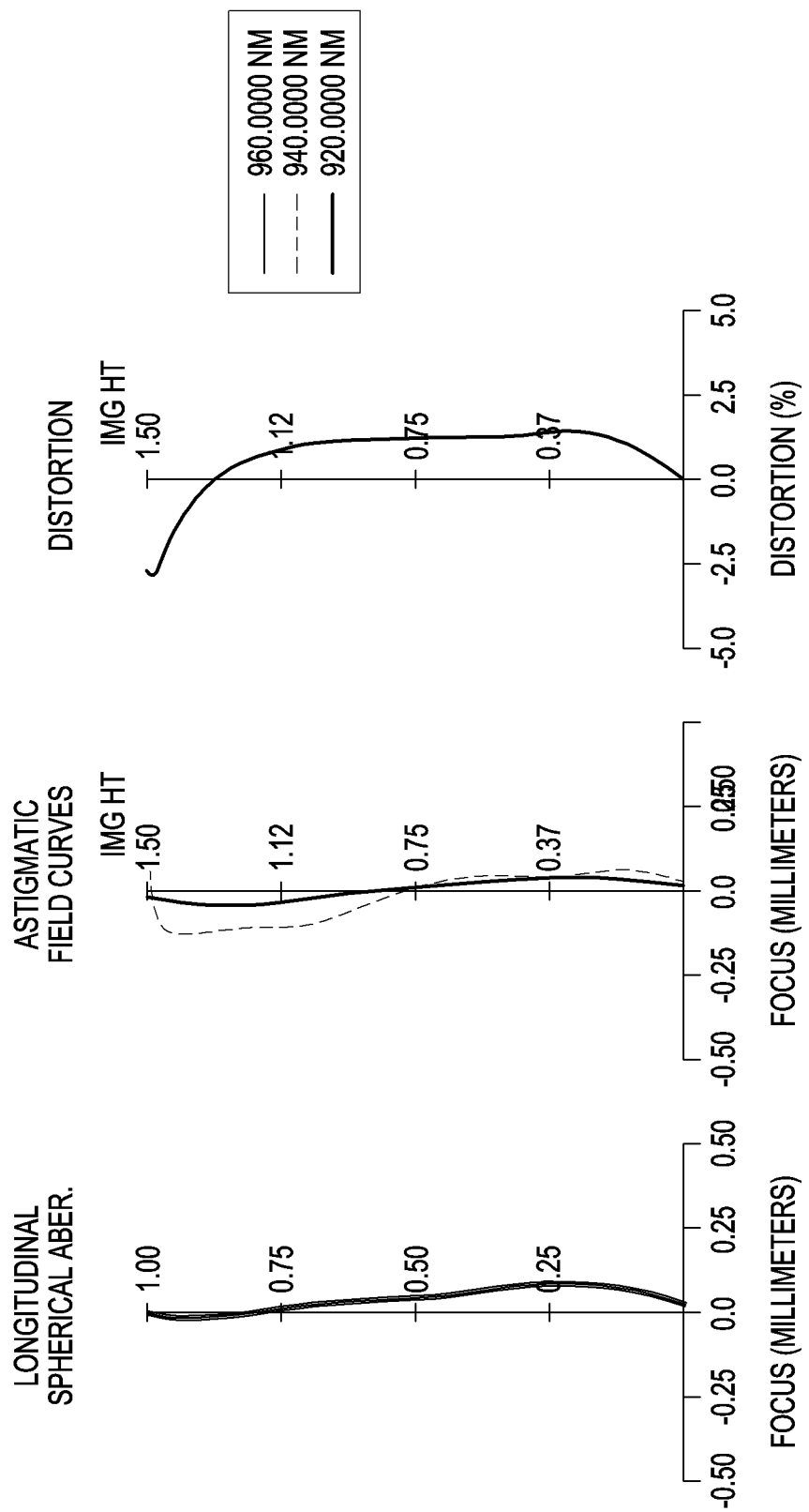
FIG. 8A is a graph representing the spherical aberration of the lens assembly according to another one of various embodiments.
FIG. 8B is a graph representing the astigmatism of the lens assembly according to another one of various embodiments.
FIG. 8C is a graph illustrating the distortion rate of the lens assembly according to another one of various embodiments.

FIG. 7 is a view illustrating a configuration of a lens assembly 500 according to another one of various embodiments. FIG. 8A is a graph representing the spherical aberration of the lens assembly 500 according to another one of various embodiments, FIG. 8B is a graph representing the astigmatism of the lens assembly 500 according to another one of various embodiments, and FIG. 8C is a graph illustrating the distortion rate of the lens assembly 500 according to another one of various embodiments.

Referring to FIG. 7 and FIGS. 8A to 8C, the lens assembly 500 may include first to fourth lenses 501, 502, 503, and 504, and a band-pass filter 405, and the first to fourth lenses 501, 502, 503, and 504 may be sequentially arranged along the optical axis A from the subject O side toward the image sensor 506 side. Although there are some differences in details of the first to fourth lenses 501, 502, 503, and 504 from the previous embodiment shown in FIG. 5, such as lens data, the lens assembly 500 may satisfy at least one of the conditions described through the preceding embodiments. The wording "conditions described through the preceding embodiment" may include the transmittance characteristic of the first lens 501 (e.g., the first lens 401 of FIG. 5), and the refractive indexes or lens surface shapes of the first to fourth lenses 501, 502, 503, and 504, the number of lens surfaces including an inflection point, the conditions presented through Equations 1 to 3, or the materials of the first to fourth lenses 501, 502, 503, and 504.

According to an embodiment, the lens assembly 500 may not include a separate diaphragm (e.g., the diaphragm S in FIG. 5). For example, in the lens assembly 500, the object side surface S2 of the first lens 501 may function as the opening surface (aperture stop) of the lens assembly 500.

Lens data of the lens assembly 500 are shown in Table 4 below, in which "object" may indicate a subject, and "S2 to S11" may indicate the surfaces of the respective lenses 501, 502, 503, and 504 and/or the band-pass filter 505. The lens assembly 500 has a focal length of 1.904 mm, an F-number of 1.12, an angle of view of 78.4 degrees, and a maximum image height of 1.5 mm, and may satisfy at least one of the above-described equations.

TABLE 4

| Surface | Radius of curvature | Thickness or air gap | Refractive index | Abbe number |
|---|---|---|---|---|
| Object | INFINITY | INFINITY | | |
| S2 | 1.72753 | 0.553418 | 1.582500 | 30.1900 |
| S3 | 3.17493 | 0.080000 | | |
| S4 | 1.94635 | 0.397037 | 1.635505 | 23.9010 |
| S5 | 2.10573 | 0.100838 | | |
| S6 | −7.69952 | 0.515423 | 1.635505 | 23.9010 |
| S7 | −1.11047 | 0.100000 | | |
| S8 | 1.27045 | 0.350000 | 1.635505 | 23.9010 |
| S9 | 0.267112 | 0.267112 | | |
| S10 | INFINITY | 0.300000 | 1.516798 | 64.1983 |
| S11 | INFINITY | 0.370000 | | |
| Image surface | INFINITY | | | |

Aspherical coefficients of the first to fourth lenses 501, 502, 503, and 504 are shown in Tables 5 and 6 below.

TABLE 5

| | S2 | S3 | S4 | S5 |
|---|---|---|---|---|
| K | −99.000000 | 9.912100 | 0.560161 | 1.399029 |
| A | 0.177479E+01 | −0.512059E+00 | −0.799243E+00 | 0.379203E+00 |
| B | −0.153624E+02 | −0.658051E+00 | 0.394245E+01 | −0.488573E+01 |
| C | 0.956621E+02 | 0.607808E+01 | −0.364164E+02 | 0.250366E+02 |
| D | −0.406319E+03 | −0.285070E+02 | 0.183957E+03 | −0.941454E+02 |
| E | 0.114256E+04 | 0.975832E+02 | −0.529614E+03 | 0.224331E+03 |
| F | −0.208597E+04 | −0.224377E+03 | 0.909663E+03 | −0.323657E+03 |
| G | 0.236747E+04 | 0.311028E+03 | −0.922233E+03 | 0.273768E+03 |
| H | −0.151368E+04 | −0.2322020E+03 | 0.508203E+03 | −0.125026E+03 |
| J | 0.415783E+03 | 0.712984E+02 | −0.117075E+03 | 0.238290E+02 |

TABLE 6

| | S6 | S7 | S8 | S9 |
|---|---|---|---|---|
| K | −99.000000 | −34.966230 | 0.134549 | −1.879691 |
| A | 0.996477E+00 | −0.171170E+01 | −0.169106E−01 | −0.194544E+00 |

TABLE 6-continued

|   | S6 | S7 | S8 | S9 |
|---|---|---|---|---|
| B | −0.585933E+01 | 0.119472E+02 | −0.331380E+01 | −0.778342E+00 |
| C | 0.286682E+02 | −0.597450E+02 | 0.173504E+02 | 0.344459E+01 |
| D | −0.104628E+03 | 0.202028E+03 | −0.627653E+02 | −0.798102E+01 |
| E | 0.239036E+03 | −0.449788E+03 | 0.150600E+03 | 0.118735E+02 |
| F | −0.324465E+03 | 0.645678E+03 | −0.231241E+03 | −0.115421E+02 |
| G | 0.254356E+03 | −0.568071E+03 | 0.216897E+03 | 0.705220E+01 |
| H | −0.106395E+03 | 0.276336E+03 | −0.112753E+03 | −0.244943E+01 |
| J | 0.183891E+02 | −0.566704E+02 | 0.247908E+02 | 0.367326E+00 |

Figure 9:
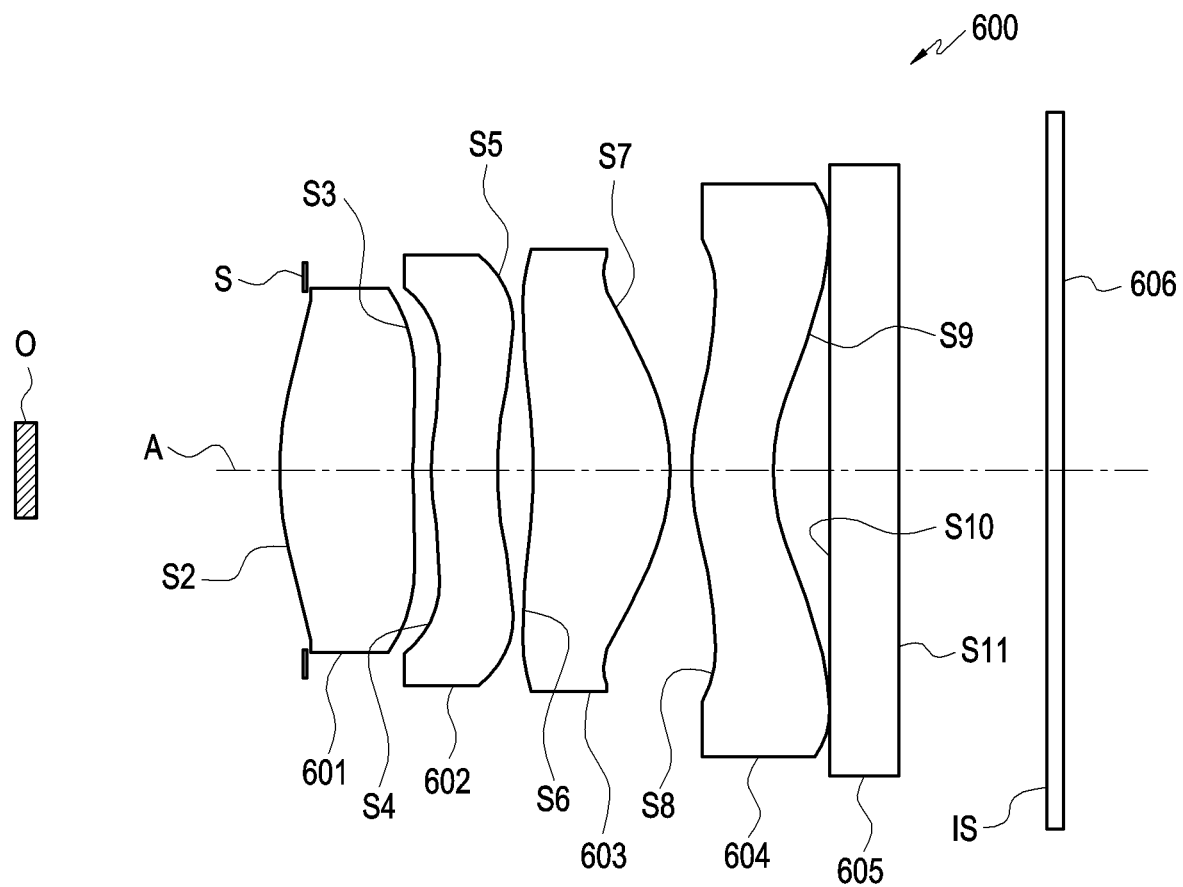
FIG. 9 is a view illustrating a configuration of a lens assembly according to still another one of various embodiments.
Figure 10:
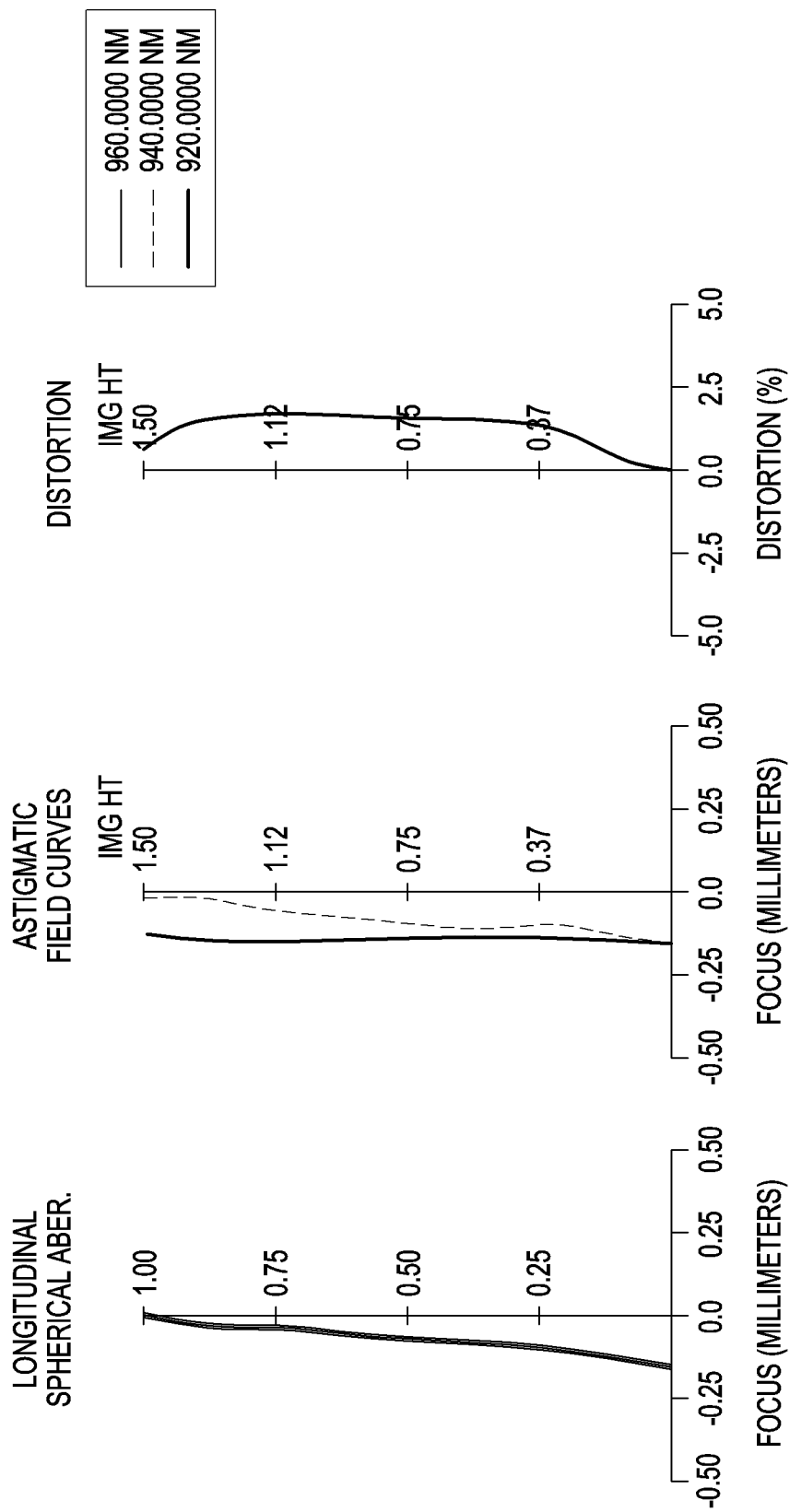
FIG. 10A is a graph representing the spherical aberration of the lens assembly according to still another one of various embodiments.
FIG. 10B is a graph representing the astigmatism of the lens assembly according to still another one of various embodiments.
FIG. 10C is a graph illustrating the distortion rate of the lens assembly according to still another one of various embodiments.

FIG. 9 is a view illustrating a configuration of a lens assembly 600 according to still another one of various embodiments. FIG. 10A is a graph representing the spherical aberration of the lens assembly 600 according to still another one of various embodiments, FIG. 10B is a graph representing the astigmatism of the lens assembly 600 according to still another one of various embodiments, and FIG. 10C is a graph illustrating the distortion rate of the lens assembly 600 according to still another one of various embodiments.

Referring to FIG. 9 and FIGS. 10A to 10C, the lens assembly 600 may include first to fourth lenses 601, 602, 603, and 604, and a band-pass filter 605, and the first to fourth lenses 601, 602, 603, and 604 may be sequentially arranged along the optical axis A from the subject O side toward the image sensor 606 side. Although there are some differences in details of the first to fourth lenses 601, 602, 603, and 604 from the previous embodiments shown in FIGS. 5 and 7, such as lens data, the lens assembly 600 may satisfy at least one of the conditions described through the preceding embodiments.

Lens data of the lens assembly 600 are shown in Table 7 below, in which "aperture stop" may indicate the opening surface of the diaphragm S, and "S2 to S11" may indicate the surfaces of the respective lenses 601, 602, 603, and 604 and/or the band-pass filter 605. The lens assembly 600 has a focal length of 1.98 mm, an F-number of 1.26, an angle of view of 70 degrees, and a maximum image height of 1.5 mm, and may satisfy at least one of the above-described equations.

TABLE 7

| Surface | Radius of curvature | Thickness or Air gap | Refractive index | Abbe number |
|---|---|---|---|---|
| Aperture stop | INFINITY | −0.100000 | | |
| S2 | 1.70076 | 0.580383 | 1.521217 | 8.9550 |
| S3 | 3.08630 | 0.079966 | | |
| S4 | 1.42773 | 0.290139 | 1.635505 | 23.9010 |
| S5 | 1.74036 | 0.149655 | | |
| S6 | −2.98370 | 0.599570 | 1.635505 | 23.9010 |
| S7 | −0.99418 | 0.100000 | | |
| S8 | 1.21781 | 0.350000 | 1.635505 | 23.9010 |
| S9 | 0.81039 | 0.250060 | | |
| S10 | INFINITY | 0.300000 | 1.516798 | 64.1983 |
| S11 | INFINITY | 0.650000 | | |
| Image surface | INFINITY | | | |

Aspherical coefficients of the first to fourth lenses 601, 602, 603, and 604 are shown in Tables 8 and 9 below.

TABLE 8

|   | S2 | S3 | S4 | S5 |
|---|---|---|---|---|
| K | −97.609965 | 10.466068 | −3.491424 | −0.252535 |
| A | 0.186199E+01 | −0.454894E+00 | −0.408448E+00 | 0.183394E+00 |
| B | −0.160596E+02 | −0.333579E+01 | −0.303131E+01 | −0.233221E+01 |
| C | 0.100929E+03 | 0.287563E+02 | 0.113124E+02 | 0.168605E+01 |
| D | −0.430992E+03 | −0.142907E+03 | −0.316400E+02 | 0.153625E+02 |
| E | 0.121608E+04 | 0.478270E+03 | 0.996370E+02 | −0.552770E+02 |
| F | −0.222664E+04 | −0.105605E+04 | −0.266595E+03 | 0.813297E+02 |
| G | 0.253624E+04 | 0.145083E+04 | 0.452563E+03 | −0.583171E+02 |
| H | −0.162931E+04 | −0.111587E+04 | −0.422347E+03 | 0.178161E+02 |
| J | 0.449670E+03 | 0.365391E+03 | 0.165253E+03 | −0.898791E+00 |

TABLE 9

|   | S6 | S7 | S8 | S9 |
|---|---|---|---|---|
| K | −99.000000 | −9.108304 | 0.180233 | −2.427213 |
| A | −0.583806E−01 | −0.871045E+00 | −0.729710E+00 | −0.333802E+00 |
| B | 0.180546E+01 | 0.198405E+01 | 0.145495E+01 | −0.279173E+00 |
| C | −0.128125E+02 | −0.216180E+00 | −0.784100E+01 | 0.270348E+01 |
| D | 0.488753E+02 | −0.192729E+02 | 0.309174E+02 | −0.715750E+01 |
| E | −0.111350E+03 | 0.777014E+02 | −0.766539E+02 | 0.106195E+02 |
| F | 0.155386E+03 | −0.156475E+03 | 0.117700E+03 | −0.962403E+01 |
| G | −0.129618E+03 | 0.180420E+03 | −0.109163E+03 | 0.526627E+01 |
| H | 0.592991E+02 | −0.112296E+03 | 0.560650E+02 | −0.159734E+01 |
| J | −0.114403E+02 | 0.290727E+02 | −0.122668E+02 | 0.205865E+00 |

Figure 11:
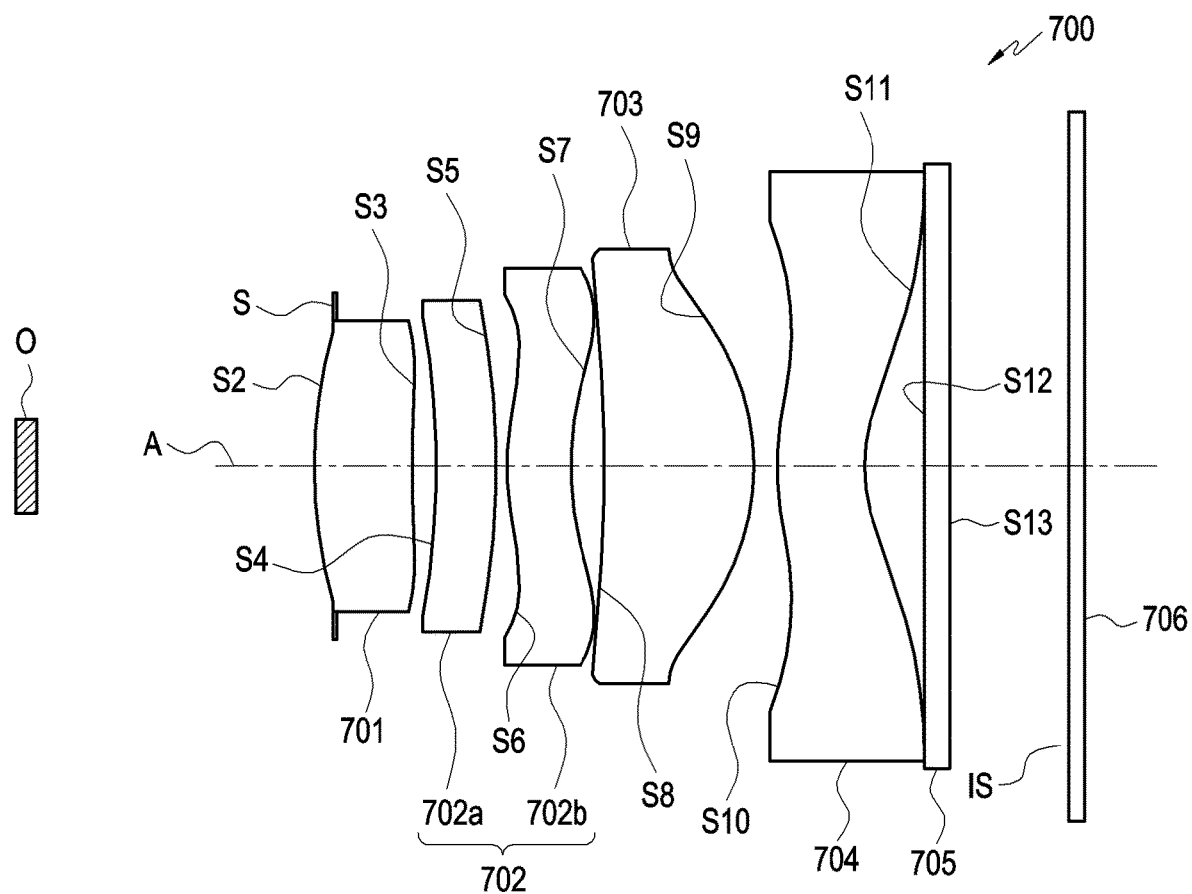
FIG. 11 is a view illustrating a configuration of a lens assembly according to yet another one of various embodiments.
Figure 12:
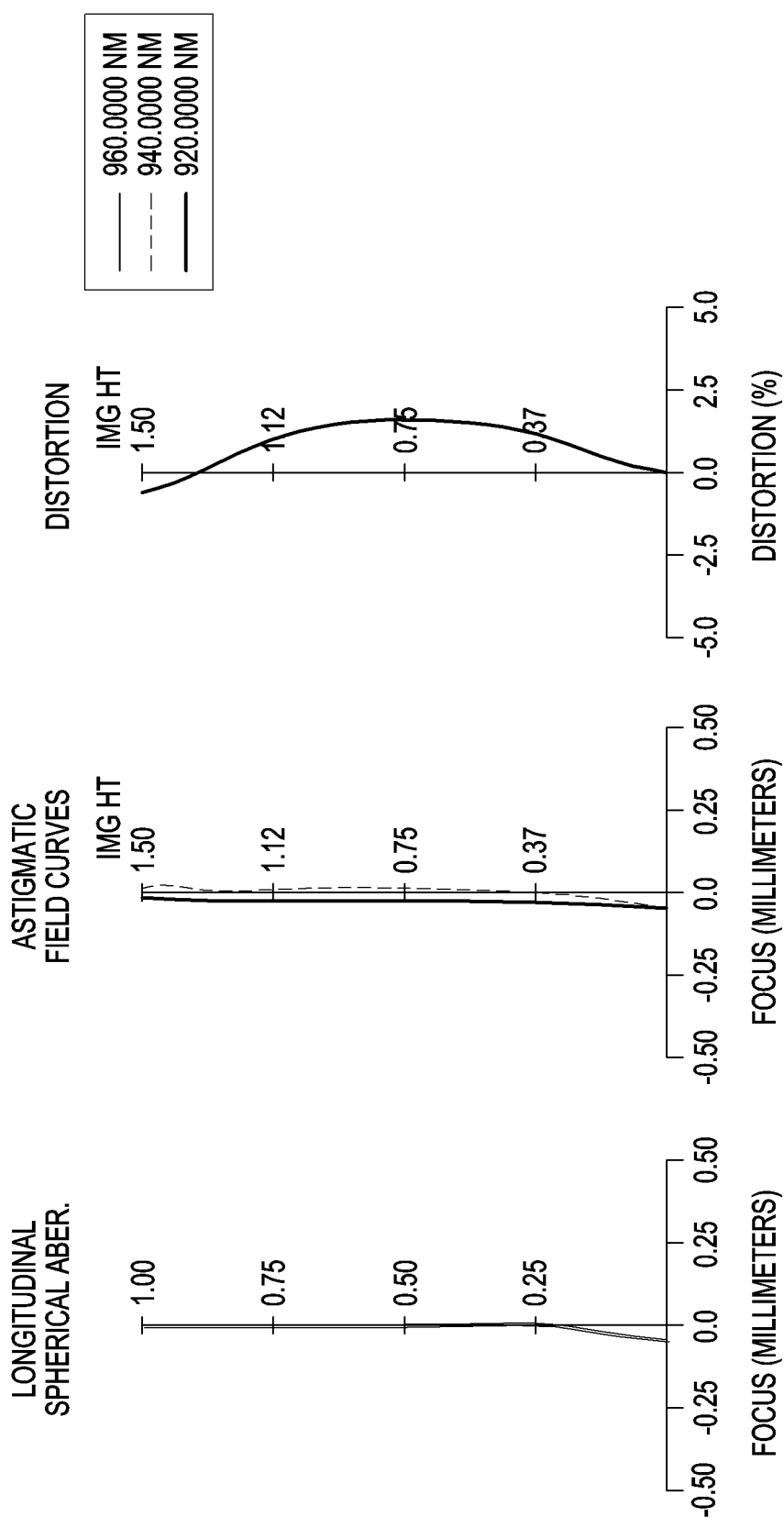
FIG. 12A is a graph representing the spherical aberration of the lens assembly according to yet another one of various embodiments.
FIG. 12B is a graph representing the astigmatism of the lens assembly according to yet another one of various embodiments.
FIG. 12C is a graph illustrating the distortion rate of the lens assembly according to yet another one of various embodiments.

FIG. 11 is a view illustrating a configuration of a lens assembly 700 according to yet another one of various embodiments. FIG. 12A is a graph representing the spherical aberration of the lens assembly 700 according to yet another one of various embodiments, FIG. 12B is a graph representing the astigmatism of the lens assembly 700 according to yet another one of various embodiments, and FIG. 12C is a graph illustrating the distortion rate of the lens assembly 700 according to yet another one of various embodiments.

Referring to FIG. 11 and FIGS. 12A to 12C, the lens assembly 700 may include first to fourth lenses 701, 702, 703, and 704, and a band-pass filter 705, and the first to fourth lenses 701, 702, 703, and 704 may be sequentially arranged along the optical axis A from the subject O side toward the image sensor 706 side. According to an embodiment, the second lens 702 may include a subject-side lens 702a and an image-sensor-side lens 702b. For example, the lens assembly 700 according to this embodiment may include five lenses, and the number of lenses included in the lens assembly may be appropriately selected in consideration of various design conditions such as aberration correction and the total length of the lens assembly.

Although there are some differences in details of the first to fourth lenses 701, 702, 703, and 704 from the previous embodiment shown in FIGS. 5, 7, and 9, such as lens shape and lens data, the lens assembly 700 may satisfy at least one of the conditions described through the preceding embodiments.

Lens data of the lens assembly 700 are shown in Table 10 below, in which "aperture stop" may indicate the opening surface of the diaphragm S, and "S2 to S13" may indicate the surfaces of the respective lenses 701, 702, 703, and 704 and/or the band-pass filter 705. The lens assembly 700 has a focal length of 1.96 mm, an F-number of 1.62, an angle of view of 74 degrees, and a maximum image height of 1.5 mm, and may satisfy at least one of the above-described equations.

TABLE 10

| Surface | Radius of curvature | Thickness or air gap | Refractive index | Abbe number |
|---|---|---|---|---|
| aperture stop | INFINITY | −0.080000 | | |
| S2 | 1.69805 | 0.417272 | 1.642200 | 22.3760 |
| S3 | 3.61006 | 0.100000 | | |
| S4 | −6.40441 | 0.250000 | 1.635505 | 23.9010 |
| S5 | −5.28293 | 0.050000 | | |
| S6 | 1.30190 | 0.270121 | 1.635505 | 23.9010 |
| S7 | 1.33653 | 0.140950 | | |
| S8 | −3.54860 | 0.630144 | 1.635505 | 23.9010 |
| S9 | −1.00325 | 0.100000 | | |
| S10 | 1.24437 | 0.368585 | 1.635505 | 23.9010 |
| S11 | 0.72688 | 0.250317 | | |
| S12 | INFINITY | 0.110000 | 1.516798 | 64.1983 |
| S13 | INFINITY | 0.500000 | | |
| Image surface | INFINITY | | | |

Aspherical coefficients of the first to fourth lenses 701, 702, 703, and 704 are shown in Tables 11 and 12 below.

TABLE 11

| | S2 | S3 | S4 | S5 | S6 |
|---|---|---|---|---|---|
| K | −99.000000 | 13.620182 | 98.950716 | 43.256897 | −2.800186 |
| A | 0.208578E+01 | 0.122112E+00 | 0.131284E+00 | 0.363417E+00 | −0.145122E+00 |
| B | 0.252628E+02 | 0.808005E+01 | 0.113138E+01 | 0.107189E+02 | −0.709834E+01 |
| C | 0.249530E+03 | 0.110623E+03 | 0.136234E+02 | 0.118664E+03 | 0.519025E+02 |
| D | 0.184301E+04 | 0.960396E+03 | 0.293403E+03 | 0.731257E+03 | −0.206048E+03 |
| E | 0.949996E+04 | 0.526441E+04 | 0.241022E+04 | 0.270424E+04 | 0.348077E+03 |
| F | 0.327284E+05 | 0.184731E+05 | 0.106198E+05 | 0.602428E+04 | 0.264870E+03 |
| G | 0.712620E+05 | 0.404949E+05 | 0.260793E+05 | 0.766564E+04 | −0.218690E+04 |
| H | 0.882525E+05 | 0.505787E+05 | 0.335881E+05 | 0.474703E+04 | 0.355362E+04 |
| J | 0.472156E+05 | 0.274310E+05 | 0.176380E+05 | 0.833076E+03 | −0.200939E+04 |

TABLE 12

| | S7 | S8 | S9 | S10 | S11 |
|---|---|---|---|---|---|
| K | −1.503440 | −99.000000 | −5.858910 | 0.265262 | −2.930372 |
| A | 0.405514E+00 | 0.352434E+00 | 0.269800E+00 | 0.479769E+00 | −0.808677E−01 |
| B | 0.672668E+01 | 0.204459E+01 | 0.375445E+01 | 0.298465E+01 | −0.204215E+01 |
| C | 0.366622E+02 | 0.453015E+01 | 0.306211E+02 | 0.137666E+02 | 0.812536E+01 |
| D | 0.140119E+03 | 0.371059E+00 | 0.137029E+03 | 0.358619E+02 | −0.171815E+02 |
| E | 0.372179E+03 | 0.196558E+02 | 0.389384E+03 | 0.619002E+02 | 0.226783E+02 |
| F | 0.682402E+03 | 0.237628E+02 | 0.708617E+03 | 0.699526E+02 | −0.190676E+02 |
| G | 0.823722E+03 | 0.279634E+02 | 0.797996E+03 | 0.489599E+02 | 0.989677E+01 |
| H | 0.586479E+03 | 0.753852E+02 | 0.501738E+03 | 0.189806E+02 | −0.288283E+01 |
| J | 0.185382E+03 | 0.415212E+02 | 0.133551E+03 | 0.304690E+01 | 0.359434E+00 |

Referring again to FIGS. 1 to 4, a camera module or an electronic device (e.g., the camera module 280 in FIG. 2 or the electronic device 300 in FIG. 3) including the above-described lens assembly 400, 500, 600, or 700 will be described.

According to certain embodiments, the lens assembly 400, 500, 600, or 700 described above may be provided as the lens assembly 210 of FIG. 2. In an embodiment, a camera module (e.g., the camera module 280 in FIG. 2) including such a lens assembly 400, 500, 600, or 700 may be implemented as the camera modules 305, 312, and 313 in FIG. 3 or FIG. 4. In some embodiments, the camera module 305 disposed on the front side of the electronic device 300 of FIG. 3 may include a plurality of cameras, for example, a first camera and a second camera. In an embodiment, the first camera of the camera module 305 may include the lens assembly 400, 500, 600, or 700 as described above, and may detect distance information on a subject using near infrared rays. The second camera of the camera module 305 may be a camera used for capturing light in the visible spectrum. For example, the second camera may detect or acquire second information on a subject, such as at least one of color information, brightness information, saturation information, and contrast information. In some embodiments, the second camera may include a plurality of cameras. Thus, in this example, the first camera may include a near infrared camera, and the second camera may be constituted with a combination of a telephoto camera and a wide-angle camera.

According to certain embodiments, a camera module (e.g., the camera module 280 in FIG. 2) including the lens assembly 400, 500, 600, or 700 may be used for security purposes such as in public spaces, living spaces, etc. depending on the design parameters for the outer diameters of the lenses or the total length of the lens assembly. For example, the lens assembly 400, 500, 600, or 700, or the camera module 280 may be utilized as a closed circuit security camera, a camera for recognizing an object in a vehicle, or a thermal imaging camera. In another embodiment, the lens assembly 400, 500, 600, or 700 may be manufactured to have a total length of about 3 mm. When so designed, the lens assembly 400, 500, 600, or 700 may be mounted in a personal electronic device such as a mobile communication terminal to provide functions such as user authentication, object recognition, augmented reality, and three-dimensional scanner.

According to certain embodiments, the electronic device 300 emits light (e.g., infrared rays or near infrared rays) toward a subject using a light source device, and the first camera of the camera module 305 may detect first information on the subject such as distance information (e.g., depth information) by detecting light emitted from the light source device and reflected by the subject. In an embodiment, the light source device may include an infrared-emitting diode or a near infrared laser light source, and the light-emitting device 306 of the electronic device 300 may be utilized as the light source device described above. In another embodiment, the electronic device 300 may include a light source device separate from the light-emitting device 306 to emit light for detecting distance information.

Hereinafter, an example of a method of controlling an electronic device including the lens assembly 400, 500, 600, or 700 or the camera module 280 or 305 will be described with reference to FIGS. 13 and 14.

Figure 13:
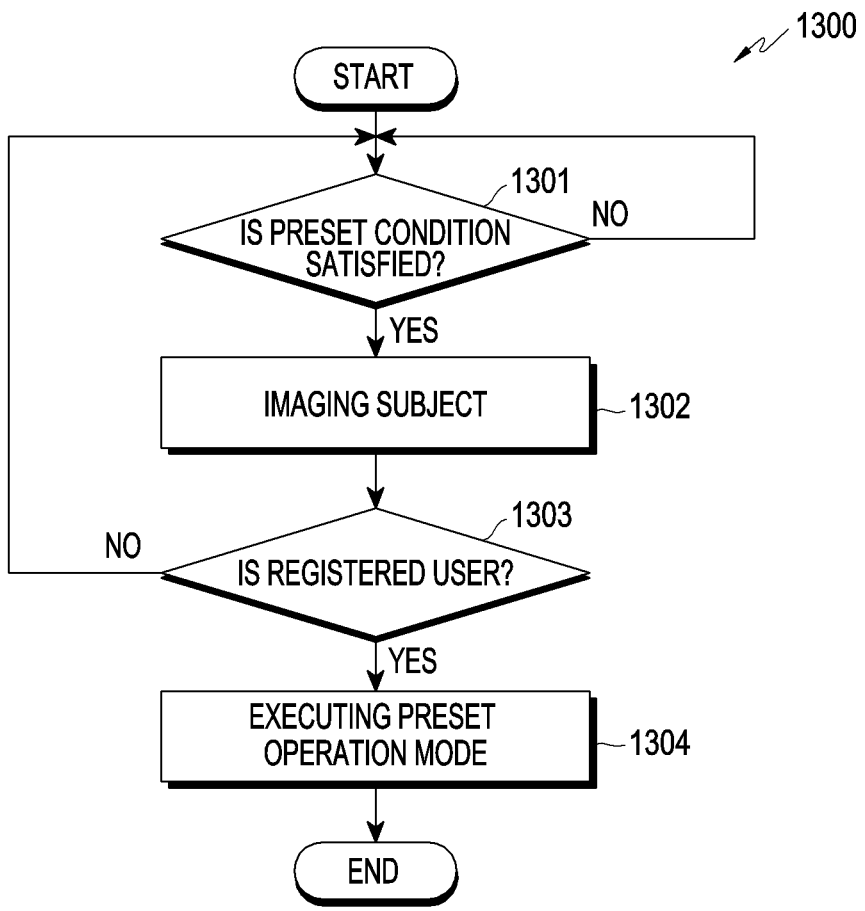
FIG. 13 is a flowchart illustrating a control method of an electronic device that includes a lens assembly according to an embodiment.

FIG. 13 is a flowchart illustrating a control method (1300) of an electronic device including a lens assembly according to an embodiment.

Referring to FIG. 13, in the control method 1300, a method of performing user authentication based on first information is shown in which the first information is acquired via a camera (e.g., the first camera of the camera module 305 in FIG. 3) including the lens assembly 400, 500, 600, or 700. For example, a processor or an image signal processor (e.g., the processor 120 in FIG. 1 or the image signal processor 260 in FIG. 2) of the electronic device may perform user authentication by comparing the first information and information stored in memory (e.g., the memory 130 or 250 in FIG. 1 or FIG. 2). Through the user authentication, the electronic device may release a lock mode or may perform authentication required by an application currently executed by the electronic device.

According to an embodiment, operation 1301 is an operation of determining whether or not a process requiring authentication is executed, and the processor 120 or the image signal processor 260 may determine whether or not preset conditions are satisfied when the electronic device (e.g., the electronic device 300 in FIG. 3) is in, for example, its lock mode, or when the electronic device is executing a specific application requiring authentication. The "preset conditions" may include, for example, a user's request (e.g., a touch input or a button operation) to release the lock mode or an authentication request for the executing application.

According to an embodiment, operation 1302 is an operation of imaging of a subject. When preset conditions are satisfied in operation 1031, the processor 120 or the image signal processor 260 may activate the first camera of the camera module 305 to image the subject. According to an embodiment, the first camera may be implemented as a near infrared camera by including the lens assembly 400, 500, 600, or 700 described above. In some embodiments, the electronic device may emit light (e.g., near infrared laser) using a light source device (e.g., the light-emitting device 306 in FIG. 3), and the emitted light may be reflected by the subject to be incident on the first camera. The first camera may acquire first information, for example, distance information (e.g., depth information) on the subject, from the incident light.

According to an embodiment, operation 1303 is an operation of determining whether or not the user is a registered user, and the processor 120 or the image signal processor 260 may perform authentication on the subject by comparing the acquired first information and the user information stored in the memory 130 or 250. When it is determined that the user is a registered user as a result of performing authentication on the subject, the processor 120 or the image signal processor 260 may perform operation 1303.

According to an embodiment, operation 1303 is an operation of executing a preset operation mode. When user information is authenticated, the electronic device (e.g., the processor 120 or the image signal processor 260) may execute the preset operation mode. The "preset operation mode" may be a mode to release the lock mode to activate the electronic device 300 or to proceed with the subsequent process of the executing application. When user authentication is not performed, the processor 120 or the image signal processor 260 may re-execute the control method 1300 from operation 1301.

Figure 14:
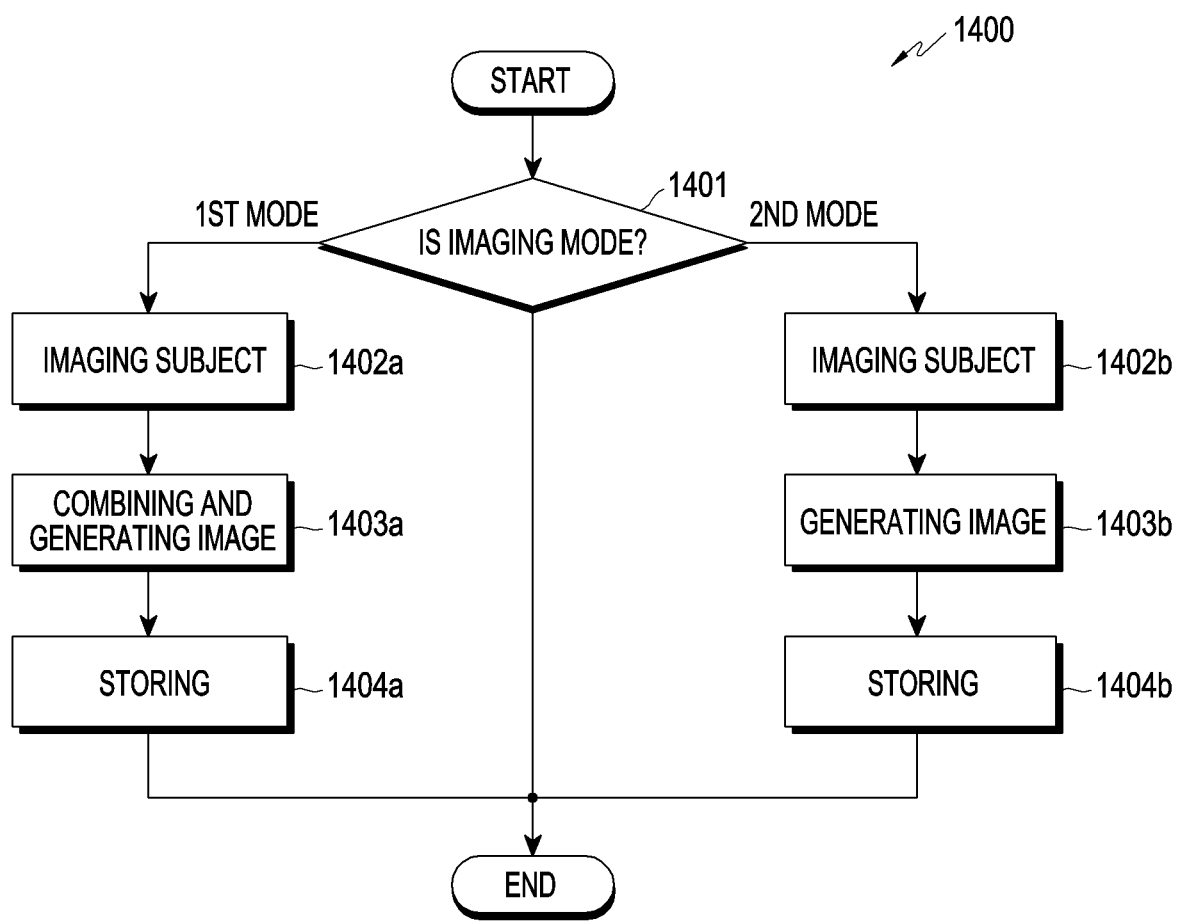
FIG. 14 is a flowchart illustrating another control method of an electronic device that includes a lens assembly according to an embodiment.

FIG. 14 is a flowchart illustrating another control method (1400) of an electronic device including a lens assembly according to an embodiment.

Referring to FIG. 14, the control method 1400 is an example of a method of capturing a subject image using at least one of the first camera and the second camera of the camera module 305. The second camera may detect or acquire second information on the subject, for example such as color information, brightness information, saturation information, and contrast information. According to an embodiment, in the first mode in which the subject is imaged using the first camera and the second camera, the processor 120 or the image signal processor 260 may generate a subject image by combining the first information acquired through the first camera and the second information acquired through the second camera. According to another embodiment, in the second mode of the control method 1400, the processor or the image signal processor may generate a subject image based on second information acquired through the second camera. Operations for generating an image through the first mode and the second mode will be described in more detail.

According to an embodiment, operation 1401 is an operation of determining an imaging mode, in which the processor 120 or the image signal processor 260 may determine whether or not to execute an imaging mode, and/or to determine the first mode and the second mode. The first mode may include, for example, a mode for imaging a subject using both the first camera and the second camera, and the second mode may include a mode for imaging the subject using the second camera.

According to an embodiment, in operation 1402a of the first mode, the processor 120 or the image signal processor 260 may image a subject using both the first camera and the second camera. According to an embodiment, light (e.g., near infrared rays) emitted from the light source device (e.g., the light-emitting element 306 in FIG. 3) may be incident on the first camera, and the first camera may acquire first information on the subject from the incident light. The first information may include distance information (e.g., depth information) of the subject, such that for example the processor 120 or the image signal processor 260 may detect or recognize a three-dimensional shape of the subject. For example, the first information may include data that serves as a basis for generating a depth map, three-dimensional modeling, so that feature points for the subject may be extracted. The second camera may detect or acquire second information on the subject, such as for example color information, brightness information, saturation information, and contrast information.

According to an embodiment, operation 1403a of the first mode is an operation of generating a subject image, and the processor 120 or the image signal processor 260 may generate the subject image by combining the first information and the second information acquired in operation 1402a. In an embodiment, the generated subject image may have a three-dimensional visual effect by including the first information (e.g., depth or distance information). In another embodiment, the generated subject image is an image in which a specific portion of the subject is emphasized based on the first information, and the image of the subject in the generated image may have three-dimensional characteristics.

According to an embodiment, operation 1404a of the first mode is an operation of storing the generated subject image, and the processor 120 or the image signal processor 260 may store the subject image generated in operation 1403a in the memory 130 or 250.

As described above, an electronic device (e.g., the electronic device 300 in FIG. 3) according to certain embodiments may acquire distance information (e.g., depth information) on a subject using a camera module including a lens assembly, for example, the first camera of the camera module 305. In some embodiments, the electronic device 300 may provide various visual effects on a subject image by combining the information acquired through another camera (e.g., the second camera of the camera module 305) with the information acquired through the first camera.

According to an embodiment, in operation 1402b of the second mode, the processor 120 or the image signal processor 260 may image a subject using the second camera. The second camera may detect or acquire second information on the subject, such as for example color information, brightness information, saturation information, and contrast information.

According to an embodiment, operation 1403b of the second mode is an operation of generating a subject image, and the processor 120 or the image signal processor 260 may generate a subject image based on the second information acquired in operation 1402b.

According to an embodiment, operation 1404b of the second mode is an operation of storing the generated subject image, and the processor 120 or the image signal processor 260 may store the subject image generated in operation 1403b in the memory 130 or 250.

In some embodiments, the second mode may perform operation 1402b using substantially both the first camera and the second camera. However, in operation 1403b of generating a subject image, the processor 120 or the image signal processor 260 excludes the information acquired through the first camera, and may generate the subject image based on the information acquired through the second camera.

Note that the control method described with reference to FIG. 13 or FIG. 14 is merely an example and does not limit the instant disclosure. The control method described with reference to FIG. 13 or FIG. 14 may include at least a part of the configuration or the operation of the processor or the image signal processor described with reference to FIG. 2.

According to an embodiment, a lens assembly (e.g., the lens assembly 400, 500, 600, or 700 in FIG. 5, FIG. 7, FIG. 9, or FIG. 11) includes: at least four lenses sequentially arranged along an optical axis from a subject to an image sensor. Among the at least four lenses, a first lens (e.g., the first lens 401, 501, 601, or 701 in FIG. 5, FIG. 7, FIG. 9, or FIG. 11) disposed closest to the subject has a visible light transmittance ranging from 0% to 5%, and, among subject-side surfaces and image-sensor-side surfaces of remaining lenses other than the first lens, at least four surfaces include an inflection point.

According to an embodiment, the lens assembly may have a first lens (e.g., the first lens 401, 501, 601, or 701 in FIG. 5, FIG. 7, FIG. 9, or FIG. 11) having a positive refractive index and disposed closest to the subject, at least one second lens (e.g., the second lens 402, 502, 602, or 702 in FIG. 5, FIG. 7, FIG. 9, or FIG. 11) disposed adjacent to the first lens having a positive refractive index, a third lens (e.g., the third lens 403, 503, 603, or 703 in FIG. 5, FIG. 7, FIG. 9, or FIG. 11) disposed adjacent to the second lens having a positive refractive index, and a fourth lens (e.g., the fourth lens 404, 504, 604, or 704 in FIG. 5, FIG. 7, FIG. 9, or FIG. 11) located adjacent to the third lens and disposed closest to the image sensor (e.g., the image sensor 406, 506, 606, or 706 in FIG. 5, FIG. 7, FIG. 9, or FIG. 11) and having a negative refractive index.

In an embodiment, the first lens, the second lens, the third lens, and the fourth lens may be sequentially arranged from the object to the image sensor along the optical axis (e.g., the optical axis A in FIG. 5, FIG. 7, FIG. 9, or FIG. 11).

According to an embodiment, the lens assembly may have an F number ranging from 1.0 to 1.7.

According to an embodiment, the lens assembly may satisfy Conditional Expression 1 as follows:

$$1.5 = < TL/ImgH = < 3.5$$

where "TL" may represent a distance from a subject-side surface of the first lens to an imaging surface of the image sensor, and "ImgH" may represent a maximum image height of an image formed on the imaging surface.

According to an embodiment, the lens assembly may satisfy Conditional Expression 2 as follows:

$$1 = < f_1/f = < 10$$

where "$f_1$" may represent a focal length of the first lens, and "f" may represent a total focal length of the lens assembly.

According to an embodiment, the first lens may be a meniscus lens in which its subject-side surface is convex and its image-sensor-side surface is concave.

According to an embodiment, all of the at least four lenses may be meniscus lenses.

According to an embodiment, the lens assembly may satisfy Conditional Expression 3 as follows:

$$0.15 =< t_{max}/f =< 0.5$$

where "$t_{max}$" may represent a center thickness of a lens having a greatest thickness on the optical axis, and "f" may represent a total focal length of the lens assembly.

According to an embodiment, at least one of the at least four lenses may be a plastic aspheric lens.

According to an embodiment, an image-sensor-side surface of the first lens may include an inflection shape in which a center portion aligned on the optical axis is concave and a peripheral portion at an edge side is convex.

According to an embodiment, the lens assembly may further include a band-pass filter (e.g., the band-pass filter 405, 505, 605, or 705 in FIG. 5, FIG. 7, FIG. 9, or FIG. 11) disposed between a lens disposed closest to the image sensor (e.g., the fourth lens 404, 504, 604, or 704 in FIG. 5, FIG. 7, FIG. 9, or FIG. 11) and the image sensor, and the band-pass filter may have a transmittance ranging from 90% to 99% with respect to light having a wavelength between 800 nm to 1000 nm, and a transmittance ranging from 0% to 1% with respect to visible light.

According to an embodiment, an electronic device (e.g., the electronic device 101 or 300 in FIG. 1 or FIG. 3) may include: a first camera (e.g., one of the camera modules 305 in FIG. 3) including a lens assembly, and configured to acquire first information on a subject based on light incident through the lens assembly; at least one second camera (e.g., another one of the camera modules 305 in FIG. 3) configured to second information on the subject different from the first information; and a processor or an image signal processor (e.g., the processor 120 in FIG. 1 or the image signal processor 260 in FIG. 2), the lens assembly may include at least four lenses sequentially arranged along an optical axis from the subject to an image sensor. Among the at least four lenses, a first lens disposed closest to the subject may have a visible light transmittance ranging from 0% to 5%, among subject-side surfaces and image-sensor-side surfaces of remaining lenses other than the first lens, at least four surfaces may include an inflection point, and the processor or the image signal processor may be configured to perform user authentication based on the first information.

According to an embodiment, the above-described electronic device may further include a light source device (e.g., the light-emitting device 306 in FIG. 3), and the first camera may acquire the first information by receiving light emitted from the light source device and reflected by the subject.

According to an embodiment, the light source device may include a near infrared laser light source.

According to an embodiment, the first information may include at least distance information on the subject, According to an embodiment, the lens assembly may satisfy Conditional Expression 4 as follows:

$$1.5 =< TL/ImgH =< 3.5$$

where "TL" may represent a distance from a subject-side surface of the first lens to an imaging surface of the image sensor, and "ImgH" may represent a maximum image height of an image formed on the imaging surface.

According to an embodiment, the processor or the image signal processor may be configured to generate an image of the subject by combining the first information and the second information.

According to an embodiment, the second information may include at least one of color information, brightness information, saturation information, and contrast information of the subject.

According to an embodiment, the first information may include at least distance information of the subject, the second information may include at least one of color information, brightness information, saturation information, and contrast information of the subject, and the processor or the image signal processor may be configured to generate an image of the subject by combining the first information and the second information.

According to an embodiment, the lens assembly may satisfy Conditional Expression 5 as follows:

$$0.15 =< t_{max}/f =< 0.5$$

where "$t_{max}$" may represent a center thickness of a lens having a greatest thickness on the optical axis, and "f" may represent a total focal length of the lens assembly).

According to an embodiment, the lens assembly described above or an electronic device including the lens assembly may further include a band-pass filter disposed between a lens disposed closest to the image sensor and the image sensor, and the band-pass filter may have a transmittance ranging from 90% to 99% with respect to light having a wavelength between 800 nm to 1000 nm, and a transmittance ranging from 0% to 1% with respect to visible light.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the disclosure has been shown and described with reference to certain embodiments thereof, it will be understood by those skilled in the art that various changes in form and details may be made therein without departing from the spirit and scope of the disclosure as defined by the appended claims.

What is claimed is:

1. A lens assembly comprising:
   at least four lenses sequentially arranged along an optical axis from a subject to an image sensor,
   wherein a first lens disposed closest to the subject among the at least four lenses has a visible light transmittance ranging from 0% to 5% such that the first lens is configured to block visible light and to prevent the lens assembly from being visually recognized by a user when the lens assembly is mounted in an electronic device,
   wherein the first lens, a second lens, and a third lens among the at least four lenses disposed sequentially from the subject have positive refractive power, and a fourth lens among the at least four lenses disposed closest to the image sensor has negative refractive power, and wherein, other than a subject-side surface of the first lens, every surface of the at least four lenses include an inflection point.

2. The lens assembly of claim 1, wherein the lens assembly has an F number ranging from 1.0 to 1.7.

3. The lens assembly of claim 1, wherein the lens assembly satisfies Conditional Expression 1 as follows:

$$.5 =< TL/ImgH =< 3.5$$

wherein "TL" represents a distance from the subject-side surface of the first lens to an imaging surface of the image sensor, and "ImgH" represents a maximum image height of an image formed on the imaging surface.

4. The lens assembly of claim 1, wherein the lens assembly satisfies Conditional Expression 2 as follows:

$$1 =< f_1/f =< 10$$

wherein "$f_1$" represents a focal length of the first lens, and "f" represents a total focal length of the lens assembly.

5. The lens assembly of claim 1, wherein the first lens is a meniscus lens in which its subject-side surface is convex and its image-sensor-side surface is concave.

6. The lens assembly of claim 1, wherein all of the at least four lenses are meniscus lenses.

7. The lens assembly of claim 1, wherein the lens assembly satisfies Conditional Expression 3 as follows:

$$0.15 =< t_{max}/f =< 0.5$$

wherein "$t_{max}$" represents a center thickness of a lens having a greatest thickness on the optical axis, and "f" represents a total focal length of the lens assembly.

8. The lens assembly of claim 1, wherein at least one of the at least four lenses is a plastic aspheric lens.

9. The lens assembly of claim 1, wherein an image-sensor-side surface of the first lens has an inflection shape in which a center portion aligned on the optical axis is concave and a peripheral portion at an edge side is convex.

10. The lens assembly of claim 1, further comprising:
a band-pass filter disposed between a lens disposed closest to the image sensor among the at least four lenses and the image sensor,
wherein the band-pass filter has a transmittance ranging from 90% to 99% with respect to light having a wavelength between 800 nm to 1000 nm, and a transmittance ranging from 0% to 1% with respect to visible light.

11. An electronic device comprising:
a first camera including a lens assembly, and configured to acquire first information on a subject based on light incident through the lens assembly;
at least one second camera configured to acquire second information on the subject different from the first information; and
a processor or an image signal processor,
wherein the lens assembly includes at least four lenses sequentially arranged along an optical axis from the subject to an image sensor,
wherein a first lens disposed closest to the subject among the at least four lenses has a visible light transmittance ranging from 0% to 5% such that the first lens is configured to block visible light and to prevent the lens assembly from being visually recognized by a user when the lens assembly is mounted in the electronic device, wherein the first lens, a second lens, and a third lens among the at least four lenses disposed sequentially from the subject have positive refractive power, and a fourth lens among the at least four lenses disposed closest to the image sensor has negative refractive power, wherein, other than a subject-side surface of the first lens, every surface of the at least four lenses include an inflection point, and wherein the processor or the image signal processor is configured to perform user authentication based on the first information.

12. The electronic device of claim 11, further comprising:
a light source device,
wherein the first camera acquires the first information by receiving light emitted from the light source device and reflected by the subject.

13. The electronic device of claim 12, wherein the light source device includes an infrared-emitting diode or a near infrared laser light source.

14. The electronic device of claim 11, wherein the first information includes at least distance information of the subject.

15. The electronic device of claim 11, wherein the lens assembly satisfies Conditional Expression 1 as follows:

$$1.5 =< TL/ImgH =< 3.5$$

wherein "TL" represents a distance from the subject-side surface of the first lens to an imaging surface of the image sensor, and "ImgH" represents a maximum image height of an image formed on the imaging surface.

16. The electronic device of claim 11, wherein the processor or the image signal processor is configured to generate an image of the subject by combining the first information and the second information.

17. The electronic device of claim 11, wherein the second information includes color information, brightness information, saturation information, and/or contrast information of the subject.

18. The electronic device of claim 11, wherein the first information includes at least distance information of the subject,
the second information includes color information, brightness information, saturation information, and/or contrast information of the subject, and
the processor or the image signal processor is configured to generate an image of the subject by combining the first information and the second information.

19. The electronic device of claim 11, wherein the lens assembly satisfies Conditional Expression 2 as follows:

$$0.15 =< t_{max}/f =< 0.5$$

wherein "$t_{max}$" represents a center thickness of a lens having a greatest thickness on the optical axis, and "f" represents a total focal length of the lens assembly.

20. The electronic device of claim 11, further comprising:
a band-pass filter disposed between a lens disposed closest to the image sensor among the at least four lenses and the image sensor,
wherein the band-pass filter has a transmittance ranging from 90% to 99% with respect to light having a wavelength between 800 nm to 1000 nm, and a transmittance ranging from 0% to 1% with respect to visible light.

* * * * *

UNITED STATES PATENT AND TRADEMARK OFFICE
CERTIFICATE OF CORRECTION

| | |
|---|---|
| PATENT NO. | : 11,598,933 B2 |
| APPLICATION NO. | : 16/655520 |
| DATED | : March 7, 2023 |
| INVENTOR(S) | : Dongwoo Kim et al. |

It is certified that error appears in the above-identified patent and that said Letters Patent is hereby corrected as shown below:

In the Claims

Column 31, Claim 3, Line 11 should read as follows:
--$1.5 =< TL/ImgH =< 3.5$--

Signed and Sealed this
Eleventh Day of April, 2023

Katherine Kelly Vidal
*Director of the United States Patent and Trademark Office*